United States Patent
Mdini et al.

(10) Patent No.: US 11,138,163 B2
(45) Date of Patent: Oct. 5, 2021

(54) AUTOMATIC ROOT CAUSE DIAGNOSIS IN NETWORKS BASED ON HYPOTHESIS TESTING

(71) Applicant: EXFO Inc., Québec (CA)

(72) Inventors: Maha Mdini, Rennes (FR); Justin Whatley, Montreal (CA); Sylvain Nadeau, Vaudreuil-Dorion (CA)

(73) Assignee: EXFO SOLUTIONS SAS, Saint-Jacques de Lande (FR)

( * ) Notice: Subject to any disclaimer, the term of this patent is extended or adjusted under 35 U.S.C. 154(b) by 169 days.

(21) Appl. No.: 16/669,033

(22) Filed: Oct. 30, 2019

(65) Prior Publication Data

US 2021/0011890 A1 Jan. 14, 2021

Related U.S. Application Data

(60) Provisional application No. 62/872,874, filed on Jul. 11, 2019.

(51) Int. Cl.
*G06F 16/00* (2019.01)
*G06F 16/21* (2019.01)
(Continued)

(52) U.S. Cl.
CPC ........ *G06F 16/212* (2019.01); *G06F 16/2246* (2019.01); *H04L 41/0631* (2013.01); *H04L 41/142* (2013.01)

(58) Field of Classification Search
None
See application file for complete search history.

(56) References Cited

U.S. PATENT DOCUMENTS

| 7,467,067 B2 | 12/2008 | Marvasti |
| 7,590,728 B2 | 9/2009 | White |

(Continued)

FOREIGN PATENT DOCUMENTS

| CN | 102801587 A | 11/2012 |
| JP | 4721362 B2 | 4/2011 |

(Continued)

OTHER PUBLICATIONS

Fast portscan detection using sequential hypothesis testing, Jung et al., IEEE (Year: 2004).*

(Continued)

*Primary Examiner* — Jean M Corrielus
(74) *Attorney, Agent, or Firm* — McDonnell Boehnen Hulbert & Berghoff LLP

(57) ABSTRACT

An embodiment may involve obtaining a set of data records including features characterizing operational aspects of a communication network. Each data record may include a feature vector and performance metrics of the communication network. Each feature vector may include a multiple elements corresponding to feature-value pairs. A first statistical analysis may be applied to the set of data records and their performance metrics to identify major contributors to degraded network performance. A second statistical analysis may be applied to identify elements that negatively influence the major contributors, and to discriminate between additive effects and incompatibilities as the source of negative influence. For each major contributor, a hierarchical dependency tree may be constructed with the major contributor as the root node and influencer elements as other nodes. Redundant dependencies may be removed, mutually dependent influencer elements grouped, and only the longest edges retained, in order to create dependency graph.

20 Claims, 14 Drawing Sheets

(51) Int. Cl.
*G06F 16/22* (2019.01)
*H04L 12/24* (2006.01)

(56) References Cited

U.S. PATENT DOCUMENTS

| | | | |
|---|---|---|---|
| 7,617,170 | B2 | 11/2009 | Chesla |
| 7,620,523 | B2 | 11/2009 | Marvasti et al. |
| 7,886,064 | B2 * | 2/2011 | Nomura ................ H04L 67/16 709/229 |
| 7,953,685 | B2 | 5/2011 | Liu et al. |
| 8,582,457 | B2 | 11/2013 | Leemet et al. |
| 9,026,644 | B2 | 5/2015 | Parker et al. |
| 9,122,602 | B1 | 9/2015 | Jewell et al. |
| 9,172,593 | B2 | 10/2015 | Kane |
| 9,184,929 | B2 * | 11/2015 | Cruickshank, III .. H04L 43/067 |
| 9,298,538 | B2 | 3/2016 | Marvasti et al. |
| 9,414,247 | B2 | 8/2016 | Huang |
| 9,418,088 | B1 | 8/2016 | Noll |
| 9,424,121 | B2 * | 8/2016 | Kushnir ............. G06F 11/0709 |
| 9,516,053 | B1 | 12/2016 | Muddu et al. |
| 9,654,361 | B2 | 5/2017 | Vasseur et al. |
| 9,667,521 | B2 | 5/2017 | Pietrowicz et al. |
| 9,729,386 | B2 | 8/2017 | Kiesekamp et al. |
| 9,760,240 | B2 | 9/2017 | Maheshwari et al. |
| 9,853,867 | B2 | 12/2017 | Baccarani |
| 9,900,332 | B2 | 2/2018 | Muddu et al. |
| 9,961,571 | B2 | 5/2018 | Yang et al. |
| 10,061,637 | B1 | 9/2018 | Halbersberg et al. |
| 10,083,073 | B2 | 9/2018 | Ambichl et al. |
| 10,165,457 | B2 | 12/2018 | Fernandez Arboleda et al. |
| 10,210,036 | B2 | 2/2019 | Iyer et al. |
| 10,289,473 | B2 | 5/2019 | Mendes et al. |
| 10,397,810 | B2 | 8/2019 | Yang et al. |
| 10,489,363 | B2 | 11/2019 | Yang et al. |
| 10,515,079 | B2 | 12/2019 | Chamarajnagar |
| 10,637,744 | B2 | 4/2020 | Carroll et al. |
| 10,686,681 | B2 | 6/2020 | Medas et al. |
| 10,715,391 | B2 | 7/2020 | Rahman et al. |
| 10,771,313 | B2 | 9/2020 | Tedaldi et al. |
| 2003/0126254 | A1 * | 7/2003 | Cruickshank, III .... H04L 41/00 709/224 |
| 2013/0097463 | A1 | 4/2013 | Marvasti et al. |
| 2013/0262656 | A1 | 10/2013 | Cao et al. |
| 2015/0019916 | A1 | 1/2015 | Kane |
| 2016/0021173 | A1 | 1/2016 | Tapia |
| 2016/0162346 | A1 * | 6/2016 | Kushnir ............. G06F 11/0709 714/37 |
| 2016/0183109 | A1 | 6/2016 | Kiesekamp et al. |
| 2016/0241429 | A1 | 8/2016 | Froehlich |
| 2016/0253366 | A1 | 9/2016 | Hsu et al. |
| 2017/0085456 | A1 | 5/2017 | Whitner et al. |
| 2017/0207948 | A1 | 7/2017 | Ratakonda et al. |
| 2017/0331673 | A1 | 11/2017 | Iyer et al. |
| 2018/0034685 | A1 | 2/2018 | Naous |
| 2018/0276063 | A1 * | 9/2018 | Mendes ............. H04L 41/0686 |
| 2018/0285685 | A1 * | 10/2018 | Singh .................. G06F 16/9024 |
| 2018/0308001 | A1 | 10/2018 | Doddala et al. |
| 2019/0163551 | A1 | 5/2019 | Cheriton |
| 2019/0165988 | A1 | 5/2019 | Wang et al. |
| 2019/0260764 | A1 | 8/2019 | Humphrey et al. |
| 2020/0278972 | A1 | 9/2020 | Zhou et al. |
| 2021/0006453 | A1 | 1/2021 | Dutta et al. |
| 2021/0014107 | A1 | 1/2021 | Mijumbi et al. |

FOREIGN PATENT DOCUMENTS

| | | |
|---|---|---|
| WO | 2012113436 A1 | 8/2012 |
| WO | 2014040633 A1 | 3/2014 |
| WO | 2016169616 A1 | 10/2016 |
| WO | 2017172541 A1 | 10/2017 |
| WO | 2017220107 A1 | 12/2017 |
| WO | 2018188733 A1 | 10/2018 |

OTHER PUBLICATIONS

Automated End-to-End Performance Diagnosis with Hierarchical Causality Graph in Cloud Environment, Chen et al., IEEE (Year: 2016).*

Toward Predictive Fault Tolerance in a Core-Router System: Anomaly Detection Using Correlation-Based Time-Series Analysis, Jin et al., (Year: 2018).*

Mdini et al., ARCD: a Solution for Root Cause Diagnosis in Mobile Networks. 14th International Conference on Network and Service Management (CNSM), Nov. 2018, Roma, Italy. hal-01962869.

Mdini, Create your own Artificial Intelligence to monitor your Linux System! Europython, Edinburgh Jul. 23-29, 2018.

Mdini et al., Monitoring the Network Monitoring System: Anomaly Detection using Pattern Recognition, May 2017, IMT Atlantique, Astellia, France.

Palacios et al., Automatic feature selection technique for next generation self-organizing networks, IEEE Communications Letters, vol. 22, No. 6, Jun. 2018.

Monge et al. Reasoning and knowledge acquisition framework for 5G network analytics, Oct. 21, 2017, Sensors.

E. J. Khatib, Data analytics and knowledge discovery for root cause analysis in LTE self-organizing networks, PhD dissertation, 2017, University of Malaga.

Munoz et al., A method for identifying faulty cells using a classification tree-based UE diagnosis in LTE, 2017, 2017:130, DOI 10.1186/s13638-017-0914-3, EURASIP Journal on Wireless Communications and Networking.

Klaine et al., A Survey of Machine Learning Techniques Applied to Self-Organizing Cellular Networks, Jul. 12, 2017, doi:10.1109/COMST.2017.2727878, IEEE Communications Surveys and Tutorials.

Liu et al., GA-AdaBoostSVM classifier empowered wireless network diagnosis, 2018, 2018:77, EURASIP Journal on Wireless Communications and Networking.

Moysen et al., A Reinforcement Learning based solution for Self-Healing in LTE networks, 2014, 978-1-4799-4449-1/14, IEEE.

Gogoi et al., Efficient Rule Set Generation using Rough Set Theory for Classification of High Dimensional Data, 2011 International Journal of Smart Sensors and Ad Hoc Networks (IJSSAN) ISSN No. 2248-9738 (Print) vol. 1, Issue-2.

3GPP, 3rd Generation Partnership Project;Technical Specification Group Services and System Aspects; Telecommunication management; Charging management; Charging Data Record (CDR) parameter description (Release 15), 2018-12, TS 32.298 V15.5.1.

Leifler, Comparison of LEM2 and a Dynamic Reduct Classification Algorithm, Masters Thesis, Oct. 9, 2002, LiTH-IDA-EX-02-93, Artificial Intelligence & Integrated Computer Systems Division, Dept. of Computer and Information Science, Linkopings universitet.

Fortes et al., Location-based distributed sleeping cell detection and root cause analysis for 5G ultra-dense networks, 2016, 2016:149, DOI 10.1186/s13638-016-0649-6, EURASIP Journal on Wireless Communications and Networking.

Hanemann, A Hybrid Rule-Based/Case-Based Reasoning Approach for Service Fault Diagnosis, available on May 23, 2019, Leibniz Supercomputing Center, Munich, Germany.

Zheng et al., 3-Dimensional Root Cause Diagnosis via Co-analysis, Sep. 18-20, 2012, ACM 978-1-4503-1520-3/12/09, San Jose, USA.

Mahimkar et al, Towards Automated Performance Diagnosis in a Large IPTV Network, Aug. 17-21, 2009, ACM 978-1-60558-594-9/09/08, Barcelona, Spain.

Dimopoulos et al., Identifying the Root Cause of Video Streaming Issues on Mobile Devices, Dec. 1-4, 2015, DOI: 10.1145/2716281.2836109, Heidelberg, Germany.

Mahimkar et al., Rapid Detection of Maintenance Induced Changes in Service Performance, Dec. 6-9, 2011, ACM 978-1-4503-1041-3/11/0012, Tokyo, Japan.

Nagaraj et al., Structured Comparative Analysis of Systems Logs to Diagnose Performance Problems, available May 23, 2019, Purdue University.

Steinder et al., A survey of fault localization techniques in computer networks, Jul. 1, 2014, Science of Computer Programming 53 (2004) 165-194, United States.

(56) References Cited

OTHER PUBLICATIONS

Khatib et al., Data mining for fuzzy diagnosis systems in LTE networks, Jun. 1, 2015, Expert Systems with Applications 42 (2015) 7549-7559, Elsevier Ltd., Spain.
Palacios et al., Combination of multiple diagnosis systems in Self-Healing networks, Jul. 22, 2016, Expert Systems With Applications 64 (2016) 56-68, Elsevier Ltd., Spain.
Fortes et al., Contextualized indicators for online failure diagnosis in cellular networks, Apr. 4, 2015, Computer Networks 82 (2015) 96-113, Elsevier B.V., Spain.
Jin et al., Nevermind, the Problem Is Already Fixed: Proactively Detecting and Troubleshooting Customer DSL Problems, Nov. 30-Dec. 3, 2010, ACM 1-4503-0448-1/10/11, Philadelphia, USA.
Zhang et al, On Assuring End-to-End QoE in Next Generation Networks: Challenges and a Possible Solution, Jul. 2011, 0163-6804/10, IEEE Communications Magazine.
Ong et al., A Manufacturing Failure Root Cause Analysis in Imbalance Data Set Using PCA Weighted Association Rule Mining, Aug. 11, 2015, Penerbit UTM Press, Melaka, Malaysia.
Mi et al., Toward Fine-Grained, Unsupervised, Scalable Performance Diagnosis for Production Cloud Computing Systems, Jun. 2013, IEEE Transactions on Parallel and Distributed Systems, vol. 24, No. 6, DOI: 10.1109/TPDS.2013.21, IEEE Computer Society.
Mahapatro et al., Fault Diagnosis in Wireless Sensor Networks: A Survey, 2013, IEEE Communications Surveys & Tutorials, vol. 15, No. 4, DOI: 10.1109/SURV.2013.030713.00062, IEEE.
Gomez-Andrades et al., Automatic Root Cause Analysis for LTE Networks Based on Unsupervised Techniques, Apr. 2016, IEEE Transactions on Vehicular Technology, vol. 65, No. 4, DOI: 10.1109/TVT.2015.2431742, IEEE.
Fortes et al., Context-Aware Self-Healing: User Equipment as the Main Source of Information for Small-Cell Indoor Networks, Feb. 24, 2016, IEEE vehicular technology magazine, DOI: 10.1109/MVT.2015.2479657, IEEE.
Xu et al., Industrial Big Data for Fault Diagnosis: Taxonomy, Review, and Applications, Sep. 19, 2017, IEEE Access, vol. 5, DOI: 10.1109/ACCESS.2017.2731945, IEEE.
Imran et al., Challenges in 5G: How to Empower SON with Big Data for Enabling 5G, Nov./Dec. 2014, IEEE Network, IEEE.
Mdini et al., Introducing an Unsupervised Automated Solution for Root Cause Diagnosis in Mobile Networks, 2019, IEEE, Transactions on Network and Service Management DOI: 10.1109/TNSM.2019.2954340, IEEE.
Mdini, Anomaly detection and root cause diagnosis in cellular networks. Artificial Intelligence [cs.AI]. Ecole nationale supérieure Mines-Télécom Atlantique, 2019. English. NNT : 2019IMTA0144. tel-02304602.
Decker et al., Classification in Marketing Research by Means of LEM2-generated Rules, 2007, Department of Business Administration and Economics, Bielefeld University, Germany.
Extended European Search Report dated May 20, 2020, issued in corresponding European Patent Application No. 19205083.9, 13 pages.
Extended European search report dated Apr. 29, 2020 for European Application No. 19206600.9, 7 pages.
Qu et al., Multilevel Pattern Mining Architecture for Automatic Network Monitoring in Heterogeneous Wireless Communication Networks, Jun. 2016, China communications 13, No. 7: 108-116,Sep. 2, 2016.
Wang et al., An Algorithm for Mining of Association Rules for the Information Communication Network Alarms Based on Swarm Intelligence, Hindawi Publishing Corporation, Mathematical Problems in Engineering, vol. 2014, Article ID 894205, 14 pages, Jan. 1, 2014 [Online], [retrieved on Feb. 12, 2021] Retrieved from the Internet <URL: https://www.hindawi.com/journals/mpe/2014/894205/abs/>.
Brauckhoff et al.,Anomaly extraction in backbone networks using association rules, Proceedings of the 9th ACM SIGCOMM conference on Internet measurement, pp. 28-34, Nov. 4, 2009, [Online], [retrieved on Feb. 12, 2021], Retrieved from the Internet <URL: https://hal.archives-ouvertes.fr/hal-00527139/document >.
Agrawal et al.,Mining association rules between sets of items in large databases, May 1993,In Proceedings of the 1993 ACM SIGMOD international conference on Management of data (SIGMOD '93). Association for Computing Machinery, New York, NY, USA, 207-216. [Online], [retrieved on Feb. 12, 2021], Retrieved from the Internet <URL: https://doi.org/10.1145/170035.170072>.
Azevedo et al., Comparing Rule Measures for Predictive Association Rules, In Machine Learning: ECML 2007, [Online], [retrieved on Feb. 2, 2021], Retrieved from the Internet <URL: https://doi.org/10.1007/978-3-540-74958-5_47>.
Van Melle et al., Rule-based expert systems: the EMYCIN experiments of the Stanford Heuristic Programming Project, Chapter 15, EMYCIN: A knowledge Engineer's Tool for Constructing Rule-Based Expert Systems, 1984, CUMINCAD. Addison Wesley, Reading, MA.
Chen et al., Failure Diagnosis Using Decision Trees, May 2004, In International Conference on Autonomic Computing, 2004. Proceedings. IEEE, 36-43 New York, NY, USA.
M. Demetgul, Fault diagnosis on production systems with support vector machine and decision trees algorithms, 2013, The International Journal of Advanced Manufacturing Technology 67, 9-12 (2013), 2183-2194. ISBN: 0268-3768, Springer Verlag. Nov. 23, 2012.
Gardner et al., Alarm correlation and network fault resolution using the Kohonen self-organising map., GLOBECOM 1997. IEEE Global Telecommunications Conference. Conference Record, vol. 3. IEEE, 1398-1402. IEEE, Phoenix, AZ.
Han et al., Mining Frequent Patterns without Candidate Generation: A Frequent-Pattern Tree Approach. Data Mining and Knowledge Discovery 8, Jan. 1, 2004, 53-87.,[Online], [retrieved on Feb. 2, 2021], Retrieved from the Internet <URL: https://doi.org/10.1023/B:DAMI.0000005258.31418.83>.
Leskovec et al., Mining of Massive Datasets (2nd ed.), 2014, Cambridge University Press, USA.
Lin et al., Fast Dimensional Analysis for Root Cause Investigation in a Large-Scale Service Environment, Proceedings of the ACM on Measurement and Analysis of Computing Systems 4, Jun. 2, 2020, 1-23., arXiv: 1911.01225 version: 2. [Online], [retrieved on Feb. 2, 2021] Retrieved from the Internet <URL: https://doi.org/10.1145/3392149>.
Perri et al. Abductive logic programs with penalization: semantics, complexity and implementation, arXiv preprint cs/0310047 (2003). Theory and Practice of Logic Programming 5, 1-2 (2003), 123-159.
Sampath et al. Failure diagnosis using discrete-event models. IEEE transactions on control systems technology 4, 2 (1996), 105-124. ISBN: 1063-6536 Publisher: IEEE.
Tan et al., Introduction to Data Mining, (First Edition). Addison-Wesley Longman Publishing Co., Inc., USA. A fault analysis framework for cellular networks using scalable association rule mining KDD '21, Aug. 14-18, 2021, Singapore, NY.
Hermann Wietgrefe, Investigation and practical assessment of alarm correlation methods for the use in GSM access networks, NOMS 2002. IEEE/IFIP Network Operations and Management Symposium.' Management Solutions for the New Communications World'(Cat. No. 02CH37327). IEEE, 391-403. ). IEEE, Florence, Italy.
Ye et al., Board-level functional fault diagnosis using multikernel support vector machines and incremental learning. IEEE Transactions on Computer-Aided Design of Integrated Circuits and Systems 33, 2 (2014), 279-290. ISBN: 0278-0070 Publisher: IEEE.
Zawawy et al., Requirements-driven root cause analysis using Markov logic networks. In International Conference on Advanced Information Systems Engineering. CAiSE 2012, LNCS 7328, pp. 350-365, 2012, Springer-Verlag Berlin Heidelberg 2012.
Brin et al., Dynamic Itemset Counting and Implication Rules for Market Basket Data. SIGMOD 1997 Arizona USA, Rec. 26, Jun. 2, 1997, 255-264.
Alzira Faria, A Methodology for Filtering Association Rules. Revista de Ciências da Computação II, Jan. 2, 2007,14-25.
Alipio Jorge, Hierarchical Clustering for thematic browsing and summarization of large sets of Association Rules, 2004 SIAM International Conference on Data Mining, Orlando, Florida.

(56) References Cited

OTHER PUBLICATIONS

Shvachko et al., The hadoop distributed file system. In Symposium on mass storage systems and technologies (MSST). IEEE, Incline Village, NV, USA, 1-10, 2010.

Zaharia et al., Spark: Cluster computing with working sets. In Proceedings of the 2nd USENIX Conference on Hot Topics in Cloud Computing (HotCloud'10), vol. 10. USENIX Association, USA, 2010.

Toivonen et al., Pruning and Grouping Discovered Association Rules,1995, Department of computer Science, University of Helsinki, Finland.

Tan et al., Selecting the right objective measure for association analysis. Information Systems 29, 4 (2004), 293-313., Elsevier, Department of Computer Science, University of Minnesota, 200 Union Street SE, Minneapolis, MN 55455, USA.

Karn Rupesh Raj et al., Dynamic Autoselection and Autotuning of Machine Learning Models for Cloud Network Analytics, DOI 10.1109/TPDS.2018.2876844, IEEE Transactions on Parallel and Distributed Systems, vol. 30, Issue: 5, May 1, 2019, pp. 1052-1064, Oct. 19, 2018.

European Patent Office, Extended European Search Report for European patent application EP21159936, dated May 28, 2021 (7 pages).

Maha Mdini, Gwendal Simon, Alberto Blanc, and Julien Lecoeuvre, Introducing an Unsupervised Automated Solution for Root Cause Diagnosis in Mobile Networks, IEEE Transactions on Network and Service Management, vol. 17, No. 1, Mar. 2020.

Maha Mdini, Anomaly detection and root cause diagnosis in cellular networks, Artificial Intelligence [cs.AI], Ecole nationale superieure Mines-Telecom Atlantique, Oct. 2019, available at https://tel.archives-ouvertes.fr/tel-02304602.

\* cited by examiner

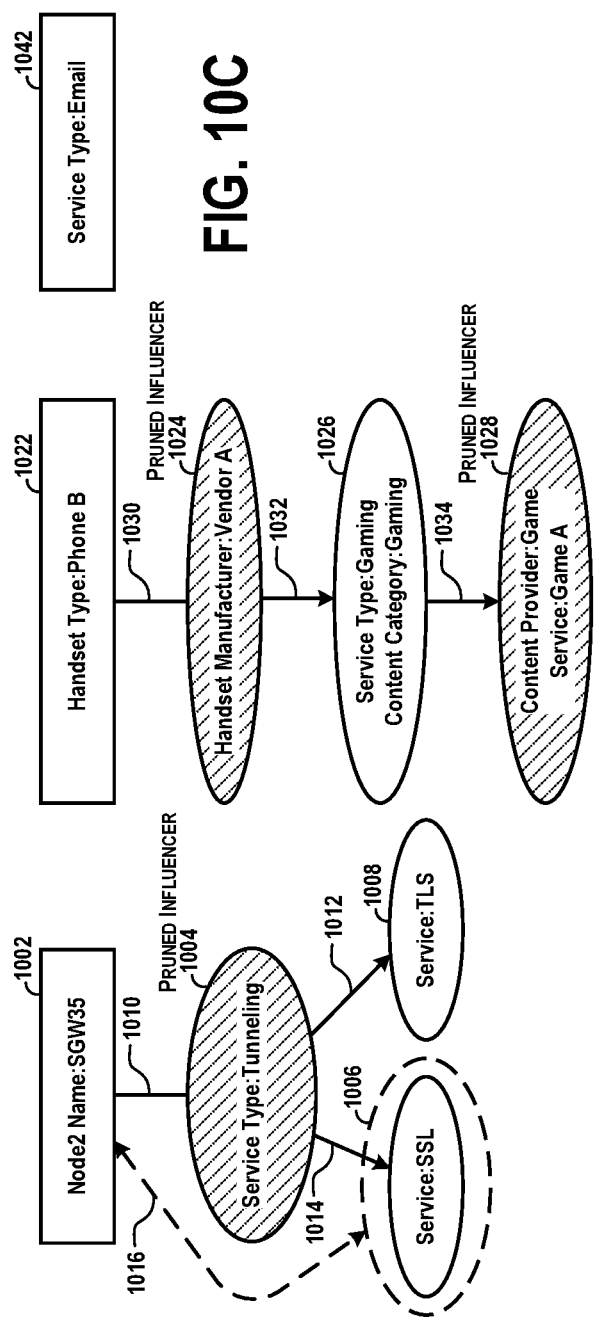

```
def find_major_contributors(df, features, metric, output_directory):

# Filtering steps
    non_redundant_features = apply_chi2(df, features, output_directory)
    features = apply_anova(df, non_redundant_features, metric, output_directory)

# Determine which elements are major contributors to innefiency for that given metric
    major_conributor_elements = apply_ttest(df, features, metric, output_directory)
    return major_conributor_elements def find_influencers(df_subset, features, metric, output_directory):

Determine which sub-elements influence major contributor given the subset and metric
    sub_elements = apply_ttest(df_subset, features, metric, output_directory)

# Qualify the type of influence (e.g., incompatibility, additive)
    sub_element_influences = qualify_influence(df_subset, features, metric)

# Form and prune dependencies, provide a graphical output
    generate_graphs(df_subset, features, sub_elements, sub_element_influences, metric, output_directory)

dataframe = load_dataset(file)
major_contributors = find_major_contributors(dataframe, features, metric_to_test, major_contributor_output_directory)

# Subsequent parsing that compares major contributors to eachother to determine how much
# they influence eachother for contributor in major_contributors:
# Gets a sample of data containing only the rows where that particular element was present
    data_subset = contributor.element_set(dataframe)
    find_influencers(data_subset, features, metric_to_test, influence_output_directory)
```

FIG. 11

AUTOMATIC ROOT CAUSE DIAGNOSIS IN NETWORKS BASED ON HYPOTHESIS TESTING

CROSS-REFERENCE TO RELATED APPLICATIONS

This application claims priority under 35 U.S.C. § 119(e) to U.S. Provisional Patent Application Ser. No. 62/872,874, filed on Jul. 11, 2019, which is incorporated herein in its entirety by reference.

BACKGROUND

Telecommunications networks complexity is increasing with the presence of multiple different Radio Access Technologies (such as 3G, 4G and 5G) and with the major network transformation towards virtualized, software-defined and cloud-based infrastructure. As such, the telecommunications networks are becoming more dynamic and self-organized and they now also need to meet stricter service level agreements for applications such as enhanced mobile broadband, essential services and massive Internet of Things. Delivering highly reliable services in such a context requires monitoring systems with advanced troubleshooting capacity to efficiently resolve any service performance degradation or outage.

The network monitoring data can take various forms depending of the networks being supervised. To list some examples: Call Traces for the Radio Access Network (RAN), Call Data Records or Session Data Records for the Mobile Core Network, metrics and key performance indicators (KPI) for the core network, log file and metrics for data center network. In all cases, the quantity of information is typically very high and isolating the cause of any performance degradation or outage is difficult. More and more, manual investigation is prohibitively difficult. Thus, automatic analysis is required to increase the efficiency of the analysis and reduce resolution time.

SUMMARY

Automatic root cause analysis has been studied in several domains for decades. A wide variety of approaches has been used, ranging from statistical to expert systems. Although some techniques could be reused across domains and applications, identifying a root cause requires more specific knowledge of the context. The type of information varies for each use case and requires different approaches to study the causality of events.

Identifying the root cause of problems in modern communication networks is still an open research question due to specific requirements related to the nature of this type of network. First, a diagnosis system should work on various types of logs (e.g., voice calls, data, multimedia sessions, and other operational aspects) because, today, communication networks carry significant amounts of data traffic as well as voice, as well as involve a variety of operations and entities even outside of the context of a call or session. Second, a diagnosis solution should work with the increasing number of features. Logs can include features related to the service (e.g. the content provider, the quality and priority classes), the network (e.g. the RAT and the involved gateways), and/or the user (e.g. the handset type and the handset manufacturer). Furthermore, these features can depend on each other due to the architecture of network and services. Third, a diagnosis solution should address the complex interplay between features—for example, an OS version not supporting a particular service. Both the service and the OS can behave normally in a majority of sessions when scrutinized independently; however, the issue might only be diagnosed in logs containing both. Finally, the diagnosis solution should focus on problems that have an actual impact on the network performance. A problem that happens sporadically in a device that is used by millions of users can have a greater importance than a problem that occurs regularly in a device used by only hundreds of users. The balance between number of occurrences and inefficiency is a matter of prioritizing mitigation actions.

Amongst automatic root cause diagnosis solutions applied in telecommunications networks, one can distinguish two main approaches. One approach involves analysis or diagnosis is implemented by scrutinizing one feature in particular. The other main approach, which may cover a range of techniques, involves analysis of network topological structure.

Single feature analysis is the most popular approach, as this can most easily be applied and interpreted by telecom network experts when attempting to isolate a root cause to a network inefficiency. As used herein, the term "network inefficiency" or "inefficiency" applied to a feature, network entity, or the like, refers to one or another form of degradation, failure, of network operation or performance. Although single feature analysis is the simplest approach for exploration, excluding scenarios where more than one feature may be contributing to the problem can miss important insights. The main drawback of this approach is that it does not properly account for possible additive effects or incompatibilities between multiple features for degradation in network performance. Network performance can only be fully explained by combining different network elements, as the impact of a single network element might be insufficient to cause any noticeable degradation. Thus, failure to explore network interactions reduces the likelihood of isolating the root cause of a problem.

Thus, diagnosis based on an isolated feature approach, while accurate, understandable and manageable by end users (since it compares elements of the same feature with one another), has its limits, as it does not take into account the dependencies between features. For example, the cells connected to a low performing Base Station Controller (BSC) may appear as inefficient. The approaches based on considering one feature at a time also have the limitation of ignoring all the problems caused by more than one feature, such as incompatibilities and causal effects. These induced effects cannot be detected unless one uses dependency analysis.

Automated root cause analysis for telecommunication networks through an analysis of network topological structure may offer the advantage of leveraging network domain knowledge for quick assessment of topologically connected elements. However, it may discount the possibility of interactions between distant, seemingly unrelated nodes. Topology based strategies also require knowledge of the telecommunication network topology which, as telecom networks become more complex, becomes increasingly problematic. Thus, a solution that ignores topology might better leverage connections between distant problematic network elements and generalize to increasingly complex telecommunication networks.

The embodiments herein provide a method identifying the root cause of the network performance degradation beyond the network topology, considering relevant co-occurrence and influence between inefficient elements such as incompatibility. More particularly, automatic root cause analysis may be accomplished by determining which feature-value pairs (elements) are most closely or strongly associated to network performance degradation and/or inefficiencies. Feature-value pairs may first be isolated as major contributors to network inefficiencies based on how they contribute to network performance metrics degradation, then grouped together when associated to the same network inefficiency, and finally, put into a hierarchy based on derived feature dependencies to isolate which feature-value pairs comprise a root cause. Through this analysis, it becomes possible to identify inefficiencies resulting from both incompatibilities between pairs of features, and additive effects of feature-based performance issues. Further, and advantageously, this analysis provides a basis for distinguishing or discriminating between these two modes of inefficiencies.

Accordingly, a first example embodiment may involve a computer-implemented method comprising: obtaining a set of data records including features that characterize operational aspects of a communication network, wherein each given data record comprises a feature vector and one or more performance metrics characterizing operational performance of the communication network, wherein each feature vector of the set comprises a plurality of elements, $e_i$, i=1, . . . , n, each made up of a feature-value pair, $(f_i, v_k)$, k=1, . . . , $m_j$, for each j=i, that identifies $f_j$ with a particular one of n operational aspects of the communication network and assigns to $v_k$ one of $m_j$ values of the particular operational aspect, and wherein the operational aspects characterized by features correspond to hardware, software, operational, or functional components related to the network operations; applying a first statistical analysis to the set of data records and their performance metrics to generate one or more data subsets, each comprising a respective subset of feature vectors that each contains a respective, particular inefficient element, wherein the respective, particular inefficient element is associated with a statistically significant negative contribution to network performance; respectively applying a second statistical analysis to each respective subset of feature vectors to (i) identify for the respective, particular inefficient element a respective set of influencer elements representing elements associated with statistically significant negative influence on causing the negative contribution to network performance associated with the respective, particular inefficient element, and (ii) where the respective set of influencer elements is non-empty, discriminate between those influencer elements associated with additive negative influence and those associated with an incompatibility with the particular operational aspect of the communication network and assigned value identified with the respective, particular inefficient element; for each respective subset of feature vectors, analyzing each possible pair of elements of the influencer elements of the respective influencer set of the respective, particular inefficient element to determine a dependency relationship based on a co-occurrence of inefficiency associated with both pair members, wherein all determined dependency relationships from all pairs represent a respective hierarchical dependency tree in which influencer elements of the respective influencer set correspond to nodes; for each determined dependency relationship in each respective hierarchical dependency tree, applying a metric-based rule to identify redundant dependencies of the respective hierarchical dependency tree, and removing at least one element of each of the redundant dependencies from each respective hierarchical dependency tree; grouping mutually dependent influencer elements of each respective hierarchical dependency tree and retaining only a longest of any multiple paths between remaining nodes to generate a respective dependency graph; and displaying at least one respective dependency graph in a display device.

A second example embodiment may involve a system comprising: one or more processors; and memory configured for storing instructions that, when executed by the one or more processors, cause the system to carry out operations including: obtaining a set of data records including features that characterize operational aspects of a communication network, wherein each given data record comprises a feature vector and one or more performance metrics characterizing operational performance of the communication network, wherein each feature vector of the set comprises a plurality of elements, $e_i$, i=1, . . . , n, each made up of a feature-value pair, $(f_i, v_k)$, k=1, . . . , $m_j$, for each j=i, that identifies $f_j$ with a particular one of n operational aspects of the communication network and assigns to $v_k$ one of $m_j$ values of the particular operational aspect, and wherein the operational aspects characterized by features correspond to hardware, software, operational, or functional components related to the network operations; applying a first statistical analysis to the set of data records and their performance metrics to generate one or more data subsets, each comprising a respective subset of feature vectors that each contains a respective, particular inefficient element, wherein the respective, particular inefficient element is associated with a statistically significant negative contribution to network performance; respectively applying a second statistical analysis to each respective subset of feature vectors to (i) identify for the respective, particular inefficient element a respective set of influencer elements representing elements associated with statistically significant negative influence on causing the negative contribution to network performance associated with the respective, particular inefficient element, and (ii) where the respective set of influencer elements is non-empty, discriminate between those influencer elements associated with additive negative influence and those associated with an incompatibility with the particular operational aspect of the communication network and assigned value identified with the respective, particular inefficient element; for each respective subset of feature vectors, analyzing each possible pair of elements of the influencer elements of the respective influencer set of the respective, particular inefficient element to determine a dependency relationship based on a co-occurrence of inefficiency associated with both pair members, wherein all determined dependency relationships from all pairs represent a respective hierarchical dependency tree in which influencer elements of the respective influencer set correspond to nodes; for each determined dependency relationship in each respective hierarchical dependency tree, applying a metric-based rule to identify redundant dependencies of the respective hierarchical dependency tree, and removing at least one element of each of the redundant dependencies from each respective hierarchical dependency tree; grouping mutually dependent influencer elements of each respective hierarchical dependency tree and retaining only a longest of any multiple paths between remaining nodes to generate a respective dependency graph; and displaying at least one respective dependency graph in a display device of the system.

In a third example embodiment provides an article of manufacture including a non-transitory computer-readable medium, having stored thereon program instructions that, when executed by one more processors of a system, cause the system to carry out operations including: obtaining a set of data records including features that characterize operational aspects of a communication network, wherein each given data record comprises a feature vector and one or more performance metrics characterizing operational performance of the communication network, wherein each feature vector of the set comprises a plurality of elements, $e_i$, i=1, . . . , n, each made up of a feature-value pair, $(f_i, v_k)$, k=, . . . , $m_j$, for each j=i, that identifies $f_j$ with a particular one of n operational aspects of the communication network and assigns to $v_k$ one of $m_j$ values of the particular operational aspect, and wherein the operational aspects characterized by features correspond to hardware, software, operational, or functional components related to the network operations; applying a first statistical analysis to the set of data records and their performance metrics to generate one or more data subsets, each comprising a respective subset of feature vectors that each contains a respective, particular inefficient element, wherein the respective, particular inefficient element is associated with a statistically significant negative contribution to network performance; respectively applying a second statistical analysis to each respective subset of feature vectors to (i) identify for the respective, particular inefficient element a respective set of influencer elements representing elements associated with statistically significant negative influence on causing the negative contribution to network performance associated with the respective, particular inefficient element, and (ii) where the respective set of influencer elements is non-empty, discriminate between those influencer elements associated with additive negative influence and those associated with an incompatibility with the particular operational aspect of the communication network and assigned value identified with the respective, particular inefficient element; for each respective subset of feature vectors, analyzing each possible pair of elements of the influencer elements of the respective influencer set of the respective, particular inefficient element to determine a dependency relationship based on a co-occurrence of inefficiency associated with both pair members, wherein all determined dependency relationships from all pairs represent a respective hierarchical dependency tree in which influencer elements of the respective influencer set correspond to nodes; for each determined dependency relationship in each respective hierarchical dependency tree, applying a metric-based rule to identify redundant dependencies of the respective hierarchical dependency tree, and removing at least one element of each of the redundant dependencies from each respective hierarchical dependency tree; grouping mutually dependent influencer elements of each respective hierarchical dependency tree and retaining only a longest of any multiple paths between remaining nodes to generate a respective dependency graph; and displaying at least one respective dependency graph in a display device.

In a fourth example embodiment, a system may include various means for carrying out each of the operations of the first and/or second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIGS. 10A, 10B, and 10C depict a conceptual display for an example application which provides the hierarchical graph produced by a system for automatic root cause analysis, in accordance with example embodiments.

FIG. 11 shows example source code with implementation considerations of steps of a method for the automatic root cause analysis, in accordance with example embodiments.

DETAILED DESCRIPTION

Figure 1:
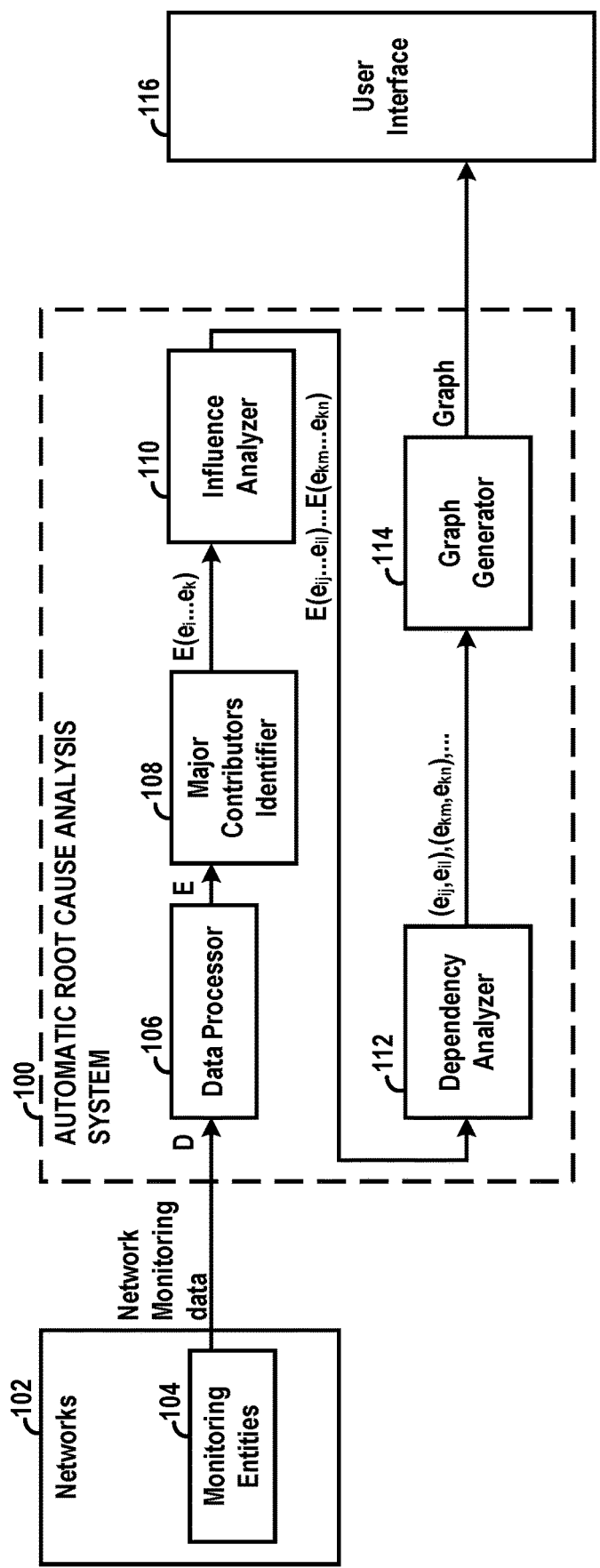
FIG. 1 is a simplified block diagram showing components of a system for automatic root cause analysis, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. EXAMPLE ANALYTICAL FORMULATION AND IMPLEMENTATION

A. Example Data, Notation, and Overview

The automatic root cause analysis for service performance degradation and outages in telecommunications networks, together referred to as network inefficiencies, may be configured to exploit data collected by the monitoring entities (e.g. physical, and virtual probes, logging systems, etc.) within telecommunication networks. The data provided by the monitoring entities form a dataset that may be used for root cause analysis. As described herein, a dataset is a collection of feature vectors, where a feature vector is a list of feature-value pairs. Each feature-value pair is also referred as an element of the feature vector. A feature refers to a measurable property, such as utilization, load, or may refer to a tag or label identifying an operational component, such as a device, service, program, or IP address of the network. A value is either categorical (e.g., a device brand or model) or numerical (e.g., a measured parameter value or Boolean value). In practice, there may be a plurality of features, and a respective plurality of possible values for each feature. In the discussion here, features will be denoted as $f_j$, j=1, ..., n, where n specifies the number of features, and a values will be denoted by $v_k$, k=1, ..., $m_j$, where $m_j$ specifies the number of values for feature $f_j$. A feature-value pair is also referred to as an element, $e_i$, where $e_i=(f_i,v_k)$, k=1, ..., $m_j$, for each j=i.

Table 1 shows a simplified example of a dataset, where the features describe the attributes of the parties involved in mobile communications, such as call or sessions. In this example, there are six features (n=6). The number of possible values for each feature is not necessarily indicated, but it may be seen that there are at least two values for each feature. Each row of the table includes a feature vector followed an associated performance metric, which, for purposes example, is a response time. There could be different and/or additional performance metrics logged for each record. Each row of the table may also correspond to a record of a database or dataset of performance data that may be obtained by one or more monitoring devices in or of a communication network. The vertical ellipses in the last row indicate that there may be more entries in the table (i.e., more records containing feature vectors). In particular, the statistical analyses described are generally applied to the performance metrics. As such, it may generally be assumed that there are sufficient numbers of records to help ensure the validity and/or accuracy of the statistical analyses. In practice, this may typically be the case, as the number of call records, session logs, performance logs, and the like usually stretch into the hundreds, thousands, or more over typical collection time spans. The four records shown in Table 1 thus serve to illustrate concepts of analysis relating to various data selection criteria, with the assumption that number of actual records involved may be much larger.

For convenience in the discussion herein, each row is labeled with a record number ("Rec No." in the table), although this label may not necessarily be included in an actual implementation of the table. It should be understood that the form and content of Table 1 is an example for illustrative purposes of the discussion herein, and should not be interpreted as limiting with respect to example embodiments herein.

TABLE 1

| | Features | | | | | | Metrics |
|---|---|---|---|---|---|---|---|
| Rec No. | Content Provider ($f_1$) | Service Type ($f_2$) | Service ($f_3$) | Content Category ($f_4$) | Host IP Address ($f_5$) | Server IP Address ($f_6$) | Response Time (ms) |
| 1 | other | unknown | undetected | other | 80.12.32.235 | 80.12.32.235 | 1.0 |
| 2 | teamspeak | VoIP | TeamSpeak | VoIP and Messaging | 31.214.227.112 | 31.214.227.112 | 10.0 |
| 3 | teamspeak | VoIP | TeamSpeak | VoIP and Messaging | 149.202.129.60 | 149.202.129.60 | 12.0 |
| 4 | bittorrent | P2P | BitTorrent | P2P | 41.251.70.198 | 41.251.70.198 | 2.0 |
| ... | ... | ... | ... | ... | ... | ... | ... |

The organization of records containing feature vectors and performance metrics into a table, such as Table 1, may serve to describe certain aspects of the analysis described below. Specifically, it may be seen that each feature corresponds to a column in the table, and that the features of each row correspond to feature vectors. The entries in the feature columns correspond to values, and the column heading—i.e., feature—plus a given value corresponds to an element. For example, the pair (Service Type, VoIP) is an element that is present in both the second and third rows or data records. In later descriptions, when the term "feature" is used, it will usually refer to an entire column. And reference to a set of data containing only a specific element will be used to mean a subset of records each containing only feature vectors having specific feature-value pair corresponding to that element. For example, a subset of the data containing only the element (Service Type, VoIP) would be a subset of only the second and third records. In addition, subsets of data need not necessarily be separate from Table 1. Rather, they may be viewed as Table 1 with ancillary information specifying which rows and/or columns are under consideration.

Also, reference below to "removing" features or elements may be viewed as identifying columns or elements that are ignored or disregarded in subsequent computations. For example, if a feature is determined to be "redundant" (as explained below) and removed, then the column corresponding to that feature may omitted from consideration in a subsequent computation that is applied to features that are not removed. However, Table 1 as a whole may remain intact throughout the computation. Finally, the above description is intended for the convenience of the discussion various analytical steps, operations, and algorithms herein. It should be understood that there may be other specific implementations that achieve automatic root cause analysis in accordance with example embodiments. For example, subsets of data may be algorithmically implemented as separated sub-tables.

In the discussion herein, a set of data records, such as those illustrated in Table 1 is referred to as a "data set E." A data set may be further distinguished according to what subset of E is under consideration. For example, $E(e_i)$ may be used to refer to a subset of E that includes only feature vectors containing the specific element $e_i$ for a given pair of i and k. Adopting the notation of Set Theory, a complementary data set, designated as $E \backslash E(e_i)$, refers to a subset of E that contains all feature vectors except those that contain $e_i$. Referring again to Table 1 for the example in which $e_i$ for a given pair of i and k corresponds to (Service Type, VoIP), then $E(e_i)$ would again be a subset of only the second and third records, and $E \backslash E(e_i)$ would be a subset of only the first and fourth records. Note that this example momentarily ignores other possible table entries represented by the vertical ellipses.

In accordance with example embodiments, automatic root cause analysis may be accomplished by determining which feature-value pairs (elements) are most associated to network inefficiencies, where, as noted, "network inefficiency" is a term used herein to describe degradation (including possible failure) of one or more aspects of network performance below some threshold or statistically significant level. A network inefficiency may also be described as a statistically significant negative contribution to one or more aspects of network performance. Thus, a feature-value pair (element) is considered to be inefficient if it causes or is associated with a statistically significant negative contribution to one or more aspects of network performance.

In order to carry out automatic root cause analysis or diagnosis based on analysis of inefficient element, feature-value pairs may first be isolated or identified as "major contributors" to network inefficiencies based on how they contribute to network performance metrics degradation; specifically, how significantly they negatively impact network performance. The isolation step may also include eliminating the effects of possibly redundant information provided by different features that may contribute to the same degradation of network performance. Inefficient elements may be grouped together when associated with the same network inefficiency, and statistically analyzed to determine other elements that may "influence" the inefficient elements. Identifying such "influence elements" may help discover elements and their associated features that may play a role in causing the detected inefficiencies. Dependencies between inefficient elements may then be analyzed and organized into a hierarchy based on derived feature dependencies. This makes it possible to isolate which feature-value pairs comprise a root cause. The basic analytical approach just outlined is described in detail below. In order to put the analytical technique in context, an example automatic root cause analysis system is first described.

B. Example System Architecture

FIG. 1 is a simplified block diagram showing components of a system 100 for automatic root cause analysis, in accordance with example embodiments. As show, system 100 includes a Data Processor 106, a Major Contributors Identifier 108, an Influence Analyzer 110, a Dependency Analyzer 112 and a Graph Generator 114. In operation together, these components may produce the hierarchical graph of potential root causes of network inefficiencies, which could be presented on a User Interface 116, for example. The Networks 102 is supervised by monitoring entities 104. The network monitoring data D may be processed by the Data Processor 106 to produce the dataset E. Then, the major contributors to network inefficiencies $E(e_i \ldots e_k)$ may be identified by the Major Contributors Identifier 108. Then, the major contributors to each subset $E(e_i)$ to $E(e_k)$ may be identified by Influence Analyzer 110. Then, the hierarchical relationship and mutual dependencies between inefficient elements may be established by the Dependency Analyzer 112. The resulting directional edges $(e_{ij}, e_{il})$, $(e_{km}, e_{kn})$, ... may then be pruned by the Graph Generator 114.

In FIG. 1, the automatic root cause analysis system 100 may be or include a computing device or system. By way of example, a computing device may include a processing unit which includes at least functional components 106, 108, 110, 112, 114. Functional components 106, 108, 110, 112, 114 can be software instructions executed on the processing unit for automatic root cause analysis. The processing unit can be a digital device that, in terms of hardware architecture, generally includes a processor, input/output (I/O) interfaces including user interface 116, a network interface and memory. The processing unit can be one or multiple virtual instances running over a virtualization layer abstracting computing resource. It should be appreciated by those of ordinary skill in the art that FIG. 1 depicts the processing unit in an oversimplified manner, and a practical embodiment may include additional components and suitably configured processing logic to support known or conventional operating features that are not described in detail herein. Also, the processing device can be a stand-alone server, group of servers, etc. for executing the automatic root cause analysis.

When the processing unit is a digital device, the components 106, 108, 110, 112, 114 may be communicatively coupled via a local interface. The local interface can be, for example, but not limited to, one or more buses or other wired or wireless connections, as is known in the art. The local interface can have additional elements, which are omitted for simplicity, such as controllers, buffers (caches), drivers, repeaters, and receivers, among many others, to enable communications. Further, the local interface may include address, control, and/or data connections to enable appropriate communications among the components.

The network interface may be used to enable the processing device to communicate on a network, such as the Internet. The network interface may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n/ac). The network interface may include address, control, and/or data connections to enable appropriate communications on the network.

A processor is used as a hardware device for executing software instructions within processing device 100. The processor can be any custom made or commercially available processor, a central processing unit (CPU), an auxiliary processor among several processors associated with the processing device, a semiconductor-based microprocessor (in the form of a microchip or chip set), or generally any device for executing software instructions. When the processing device is in operation, the processor is configured to execute software stored within the memory, to communicate data to and from the memory, and to generally control operations of the processing device pursuant to the software instructions. In an exemplary embodiment, the processor may include a mobile-optimized processor such as optimized for power consumption and mobile applications.

The I/O interfaces, including user interface 116 can be used to receive user input from and/or for providing system output. User input can be provided via, for example, a keypad, a touch screen, a scroll ball, a scroll bar, buttons, and the like. System output can be provided via a display device such as a liquid crystal display (LCD), touch screen, and the like. System output may also be provided via a display device and a printer. The I/O interfaces can also include, for example, a serial port, a parallel port, a small computer system interface (SCSI), an infrared (IR) interface, a radio frequency (RF) interface, a universal serial bus (USB) interface, and the like. The I/O interfaces can include a graphical user interface (GUI) that enables a user to interact with the processing device 100.

The data store may be used to store data. The data store may include any of volatile memory elements (e.g., random access memory (RAM, such as DRAM, SRAM, SDRAM, and the like)), nonvolatile (non-transitory computer-readable media) memory elements (e.g., ROM, hard drive, tape, CDROM, and the like), and combinations thereof. Moreover, the data store may incorporate electronic, magnetic, optical, and/or other types of storage media.

The memory may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory may incorporate electronic, magnetic, optical, and/or other types of storage media. Note that the memory may have a distributed architecture, where various components are situated remotely from one another but can be accessed by the processor.

The software in memory can include one or more software programs, each of which includes an ordered listing of executable instructions for implementing logical functions. In the example of FIG. 1, the software in the memory includes a suitable operating system (O/S) and programs. The operating system may control the execution of other computer programs and provides scheduling, input-output control, file and data management, memory management, and communication control and related services. The programs may include various applications, add-ons, etc. configured to provide end-user functionality with the processing device. In accordance with example embodiments, system 100 may include a non-transitory computer-readable medium storing instructions thereon that, when executed by one or more processors of a system, cause the system to carry out operations described herein.

The processing device can be incorporated in a test equipment or be in communication with a test equipment. The test equipment can include different physical media test modules. The physical media test modules include ports and connectors to interface to networks for monitoring and troubleshooting. In an embodiment, a mobile device can execute an application which communicates with the test equipment. The mobile device can communicate with the test equipment via Bluetooth, Wi-Fi, wired Ethernet, USB, via combinations, or the like. The mobile device is configured to communicate to the Internet via cellular, Wi-Fi, etc.

Still referring to FIG. 1, when the processing unit is running over a virtualization layer, the components 106, 108, 110, 112, 114 may run inside one or multiple virtual machine or container instances. When distributed over multiple instances, the components are exchanging information between themselves typically via a bridge network. The bridge network can be, for example, but not limited to, a virtual switch. Some of the components might also communicating on a network, such as the Internet. In this case, a virtual NIC is associated to each virtual machine while the containers are connected to the bridge network of the host system providing access to the network.

C. Example Analysis Procedures

Figure 2:
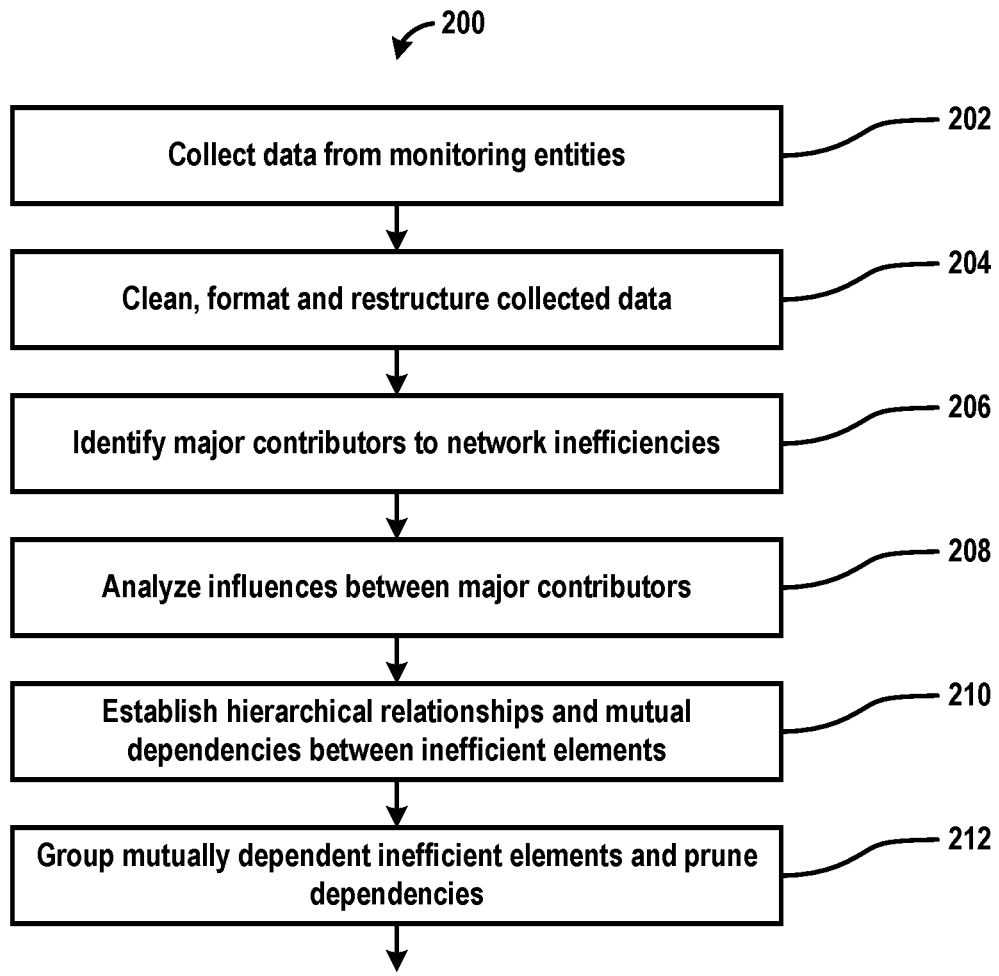
FIG. 2 is a flow chart illustrating an example method for automatic root cause analysis, in accordance with example embodiments.

Example procedures for automatic root cause analysis are shown in FIGS. 2-9, which are arranged for describing increasing levels of detail for certain aspects of the analyses. FIG. 2 is a flow chart illustrating an example method 200 for automatic root cause analysis at a top level, in accordance with example embodiments. Example method 200 includes a number of "main" steps to produce the hierarchical graph of potential root causes of network inefficiencies. First, at step 202, data from monitoring entities may be collected, followed at step 204, followed by cleaning, formatting, and restructuring to form a dataset, such as that illustrated in Table 1. Next, at step 206, major contributors to network inefficiencies may be identified. At step 208, the influence between major contributors may be analyzed. Then, at step 210, hierarchical relationships and mutual dependencies between inefficient elements may be established. Finally, at step 212, the mutually dependent inefficient elements may be grouped and the dependencies may be pruned. FIGS. 3-9 then provide elaboration the main steps and some of the sub-steps.

Data Pre-Processing

The data-preprocessing, performed by the Data Processor 106, may involve various processes of data cleaning, formatting and restructuring. In step 204, metrics having extreme values may be removed to suppress the effect of outliers, which may otherwise affect performance by skewing distributions when left uncorrected. The result of data pre-processing is a data set E of records, such as those of Table 1. As such, the records collectively include features that characterize operational aspects of a communication network. Initially, E may contain all of the records generated by the Data Processor 106. Various subsets of E may be formed along the way in subsequent analysis steps described below.

Identification of Major Contributors

As noted, a major contributor is an element that is determined to have a statistically significant negative contribution to one or more metrics associated with the data record (or feature vector) that contains the element. Identification of major contributors also involves removing redundant information from subsequent analyses and selecting relevant features evaluating the significance of elements that may be associated with inefficiency. Major contributor identification is performed by the Major Contributors Identifier 108 of FIG. 1. A major contributor is an element $e_i=(f_i,v_j)$ from dataset E that has a statistically significant negative impact on a network performance metric. For convenience in the discussion herein, a specific index value for i will generally be used in referring to data sets and elements. It should be understood that the analysis is not limited by or restricted to the specific index values used in the discussion. When the distribution of a metric for the subset of the dataset containing $e_1$ (i.e., for i=1), $E(e_1)$, is statistically significantly different from the distribution of the metric for the subset of the complementary dataset not containing $e_1$, $E\backslash E(e_1)$, the element $e_1$ is considered to contribute to the performance metric degradation if the directionality of the result indicates degradation.

Figure 3:
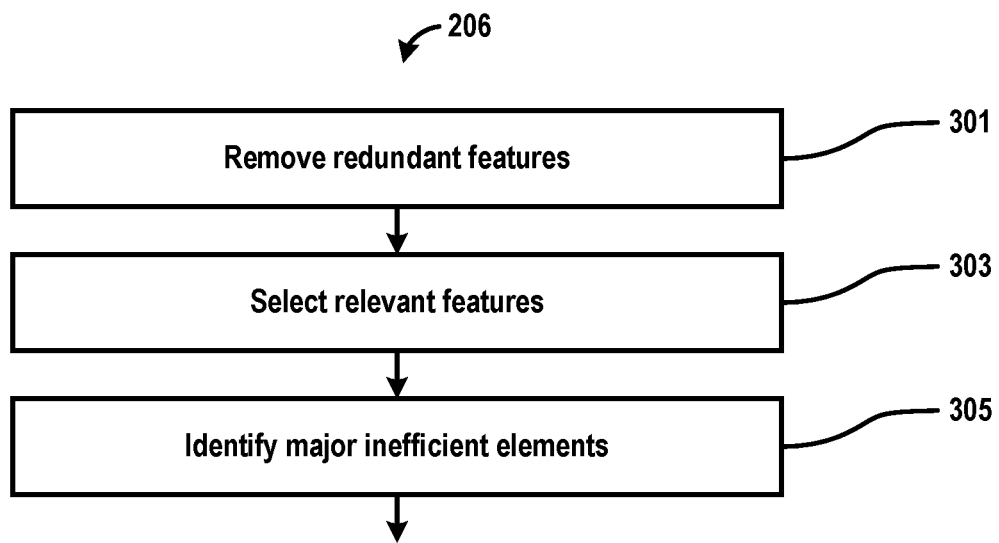
FIG. 3 is a flow chart illustrating a simplified, example method for determining the major contributors to network inefficiencies, in accordance with example embodiments.

FIG. 3 is a flow chart illustrating a simplified, example method 206 (corresponding to step 206 in FIG. 2) for determining the major contributors to network inefficiencies, in accordance with example embodiments. The identification of major contributors includes three "main" steps: removing redundant features 301, selecting relevant features 303, identifying major inefficient elements 305. These steps are further detailed in FIGS. 4-6.

Figure 4:
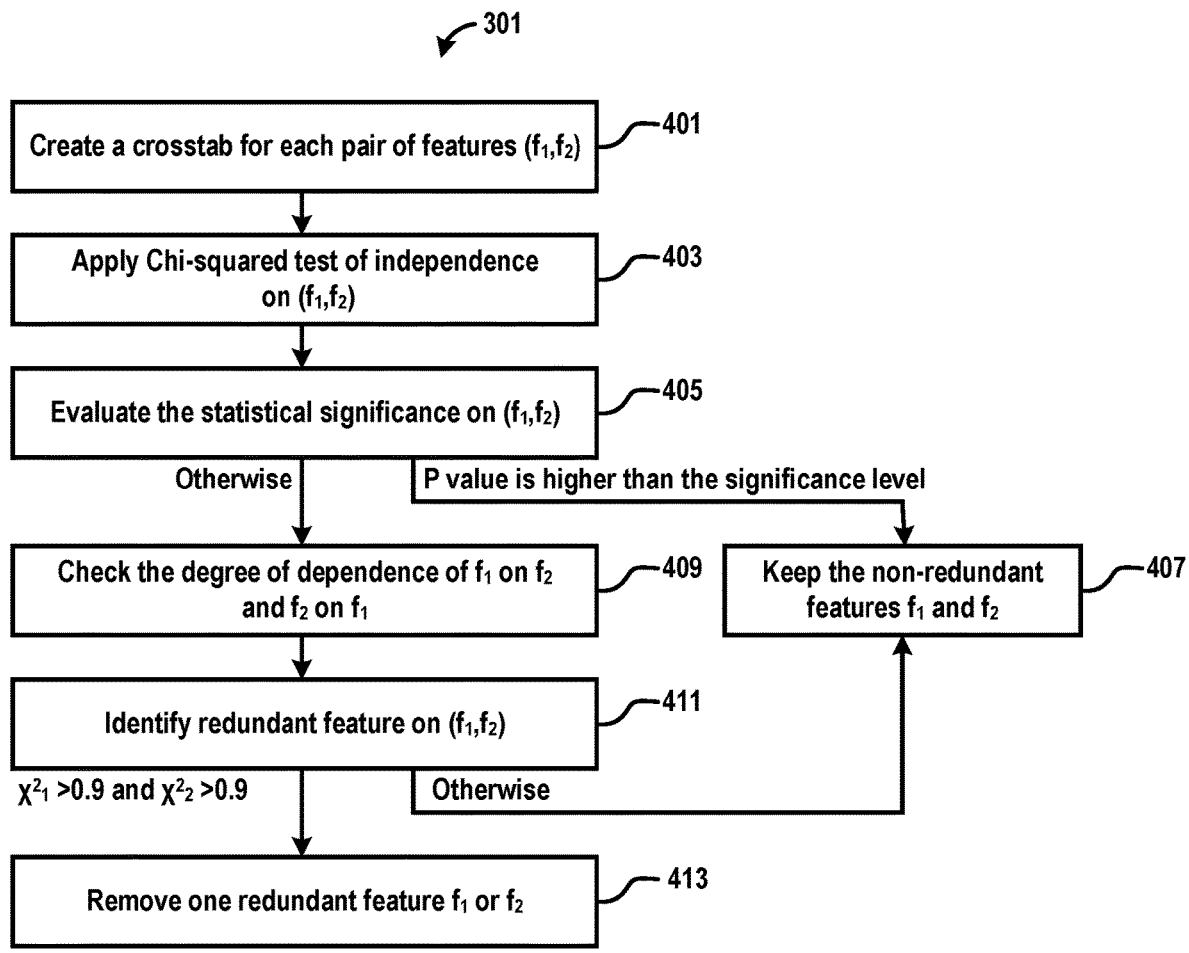
FIG. 4 is a flow chart illustrating an example sub-method of identification of major contributors, including removal of redundant features, in accordance with example embodiments.

FIG. 4 is a flow chart illustrating an example sub-method 301 (corresponding to step 301 in FIG. 3) for identification of major contributors, including removal of redundant features. Redundant features are removed from the dataset E to reduce the dimensionality of the data that need to be considered in the analysis. Advantageously, this may help optimize performance of automated root cause analysis, because features with a large amount of co-occurrence may typically represent the same or redundant information. Thus, it may not be necessary to compute the later computations on removed features separately. One feature from each dependency tuple is then removed as redundant. As mentioned above and described below, "removal" of a feature refers to omitting further consideration of that feature in a subsequent analysis step applied to features of the data set E. Features removed at this step are referred to as "redundant features," where redundancy refers to statistical information about one or more metrics associated with E that may be obtained by analyzing the features in question.

For each pair of features $(f_1, f_2)$, the method 301 starts at step 401 by creating a crosstab, which is a joint distribution of pairs of features with respect to the associated metric. Then, at 403, a Chi-squared test of independence of the distributions of the metric is applied to compare the distributions of all features against all other features. This statistical test determines whether features are highly associated to each other. The Chi-squared test produces two values: the test statistic $\chi^2$ and the P value. The test statistic $\chi^2$ quantifies the dependences between the two features. The P value quantifies the statistical significance of the test statistic and probability it arose due to chance alone. A typical threshold for the P value is 0.05 at 405 (or 0.01 for a more stringent criteria; other threshold values may be used as well). If the P value is higher than the significance level set (e.g., 0.05), the two features are considered to be non-redundant (i.e., independent) and, at step 407, both are retained in the data set.

Redundant features are those that may be considered mutually dependent. To check the degree of dependence of $f_1$ on $f_2$ and $f_2$ on $f_1$, weights are calculated at step 409 $\chi^2(f_1,f_2)$ by $\chi^2(f_1,f_1)$ and $\chi^2(f_2,f_2)$.

$$\chi^2_1 = \chi^2(f_1, f_2)/\chi^2(f_1, f_1) \quad (1)$$

$$\chi^2_2 = \chi^2(f_1, f_2)/\chi^2(f_2, f_2) \quad (2)$$

At step 411, if most of the information included in $f_1$ can be deduced from $f_2$ and vice versa (e.g., $\chi^2_1 > 0.9$ and $\chi^2_2 > 0.9$), then $f_1$ and $f_2$ are still considered redundant and one of the features is removed at 413. As noted, "removal" of features may correspond to marking the features for omission from subsequent analysis steps, and not necessarily from actual removal from E (e.g., from Table 1). Thus "removing" $f_2$ from E may correspond to omitting the column "service type" from subsequent computations. In practice, omitting a feature (column) or an element may be achieved by "marking" the removed feature as "omitted" or some other tag that may be used to control subsequent computational operations. The result of this step is the data set E with redundant features removed (or marked as such).

Figure 5:
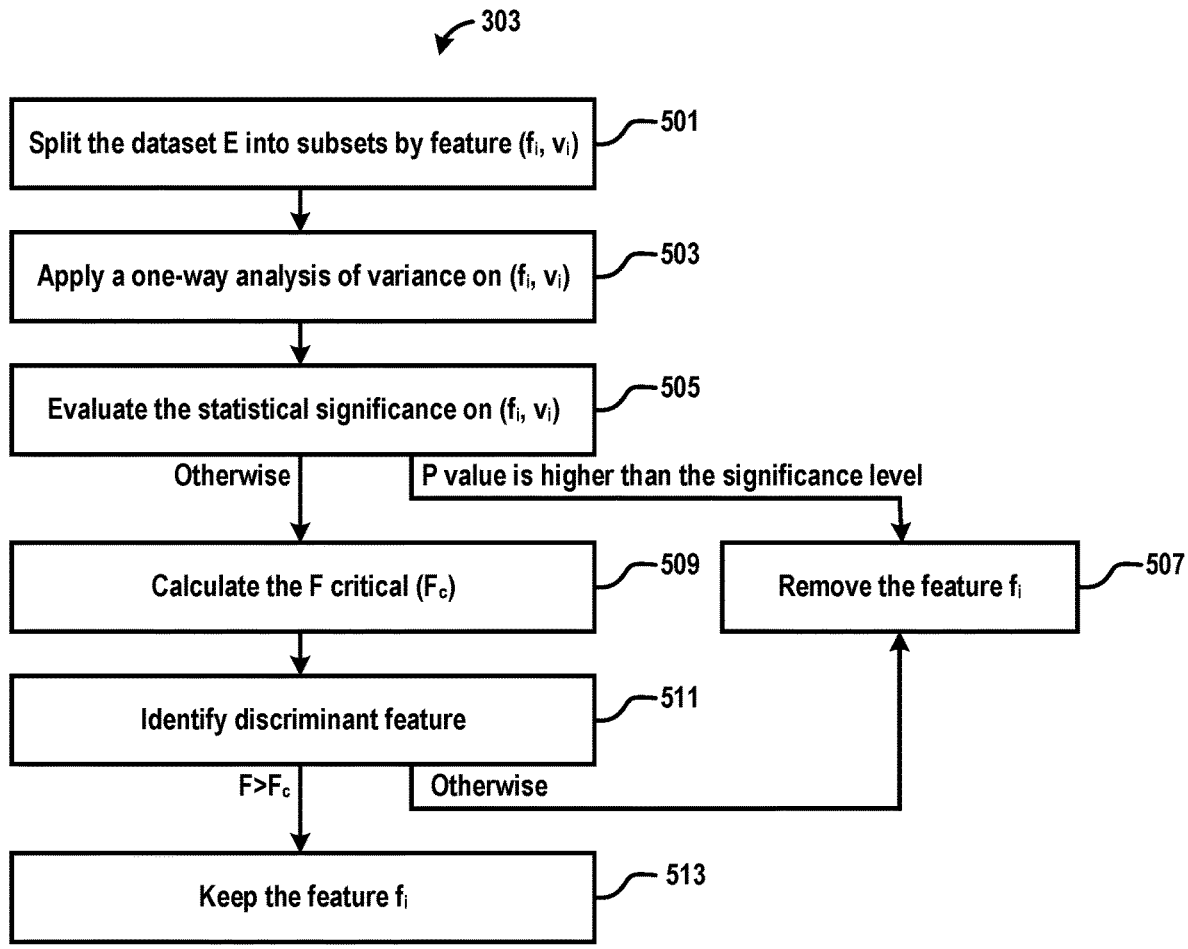
FIG. 5 is a flow chart illustrating an example sub-method of identification of major contributors, including selection of relevant features, in accordance with example embodiments.

FIG. 5 is a flow chart illustrating an example sub-method 303 (corresponding to step 303 in FIG. 3) for identification of major contributors, including selection of relevant features. Isolation of the most relevant features narrows the search space to identify features most associated with negative network performance metrics and essential in determining the root cause of a network inefficiency.

At step 501, for each feature $f_i$, the dataset E, now with redundant features removed, is split into subsets, each having the same value $v_i$. Then at step 503, a one-way analysis of variance (ANOVA) test is performed on the distribution of network performance metric for all subsets of a feature $f_i$. If there are no statistically significant differences between any individual subsets $v_i$ within a particular feature $f_i$, then the feature is not discriminant for the particular metric measured and, thus, will not contain any feature-value pair candidates for network efficiency. Thus, non-discriminant $f_i$ are not processed in the next steps; this may be achieved by marking the non-discriminant features as such. In the case where $f_i$ is discriminant, $f_i$ is carried forward to the next stage of the method.

A one-way ANOVA test computes an F value and the P value. The F value is the ratio of the variance of the metric means for the different subsets relative to the global variance of the dataset. A high valued of F indicates that associated metric is not identically distributed in all subsets; i.e., at least two groups are different from each other. The P value determines the robustness of the F value.

At step 505, the P-Statistic is compared to the upper threshold p. If the threshold is set top p>0.05 (or 0.01 for a more stringent criteria; other threshold p values may be used as well), the F-Statistic is not considered and the feature $f_i$ is rejected and so removed. Otherwise, the F value is considered statistically.

At step 509, the F-Statistic is computed by calculating F critical, $F_c$. $F_c$ is the maximum F value when all the subsets have the same distribution (with the probability of error type I $\alpha$=0.05). At step 511, if $F > F_c$, then the performance metric is not identically distributed in the different subsets. Thus, further exploration of the feature $f_i$ is considered for root cause analysis as it is discriminant; $f_i$ is kept at step 513 and used in to the next steps of the method. When this criterion is not met, $f_i$ is not used in the next steps of the method.

Figure 6:
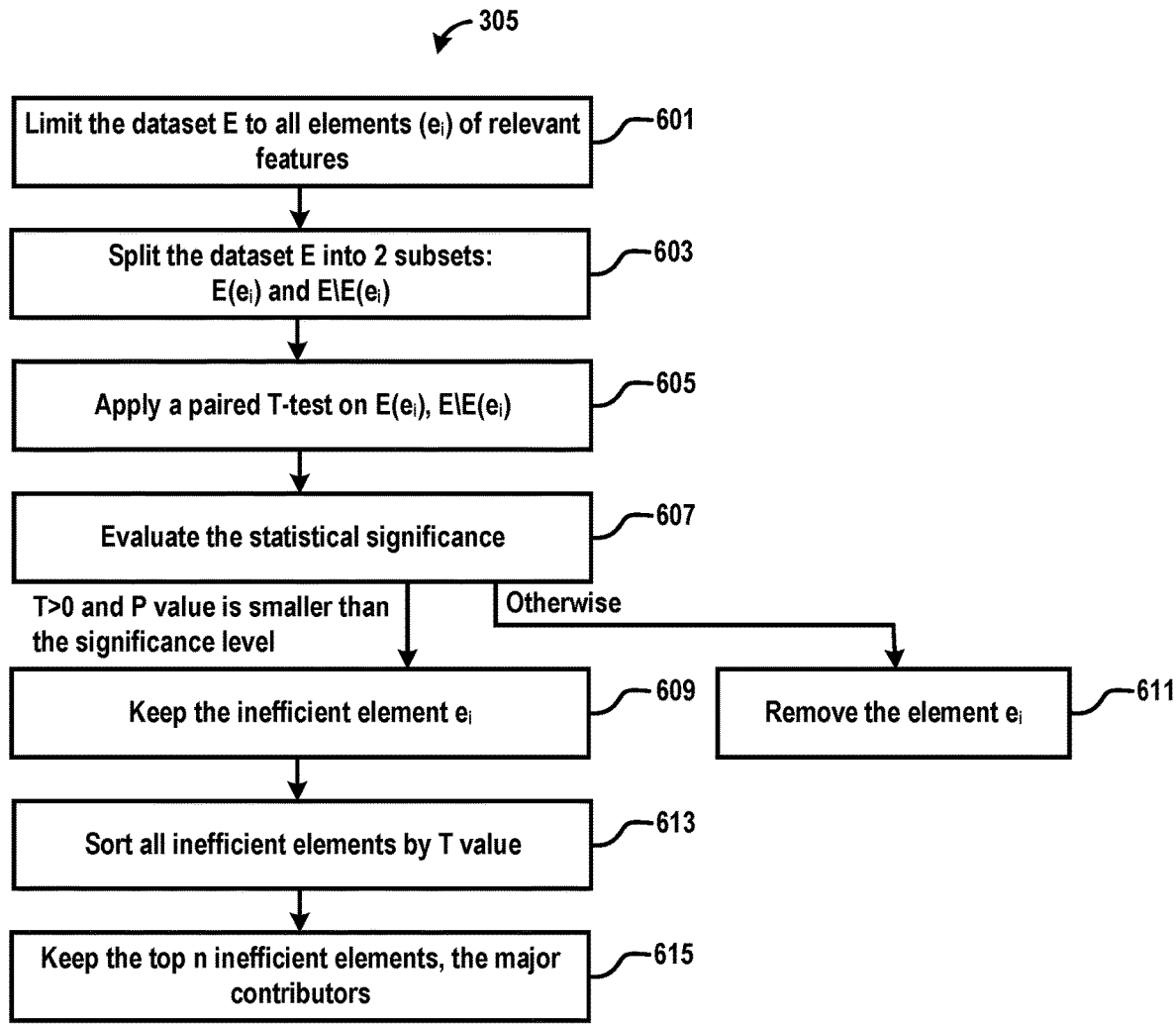
FIG. 6 is a flow chart illustrating an example sub-method of identification of major contributors, including identification of major inefficient elements, in accordance with example embodiments.

FIG. 6 is a flow chart illustrating an example sub-method 305 (corresponding to step 305 in FIG. 3) for identification of major contributors, including identification of major inefficient elements. The identification of inefficient elements 305 aims to identify the main contributors to network inefficiency. At step 601, all possible elements of relevant features are considered. Then, in step 603, for each element $e_i = (f_i, v_i)$, the dataset E, with redundant and non-discriminant features removed, is split into two subsets: one containing $e_i$, $E(e_i)$, and one containing its complementary subset, $E\backslash E(e_i)$. At step 605, the distribution of the network performance metric of these two subsets are compared using the paired T-test. The T-test produces the T statistic and the P value. At step 607, if T>0, indicating that the network performance metric is higher in $E(e_i)$ than in its complementary $E\backslash E(e_i)$, and P<0.05 (or 0.01 for a more stringent criteria; other threshold values could be used, as well), then $e_i$ is considered an inefficient element and kept at 609. Otherwise, it is removed at step 611, where, again, removal refers to omission of the removed element from consideration is subsequent analysis steps. Once all the elements have identified at step 609, the inefficient elements are sorted by the T statistic at step 613. At step 615, the top N elements in order of increasing T statistic are selected (e.g. N=50). This selection narrows the search space for a probably root cause of inefficiency and the elements are put forward as major contributors to network inefficiency based on their association with worse metric scores. Note that "N" in this context should not be confused with "n" introduced above as referring to the number of features.

Influence Analysis

Figure 7:
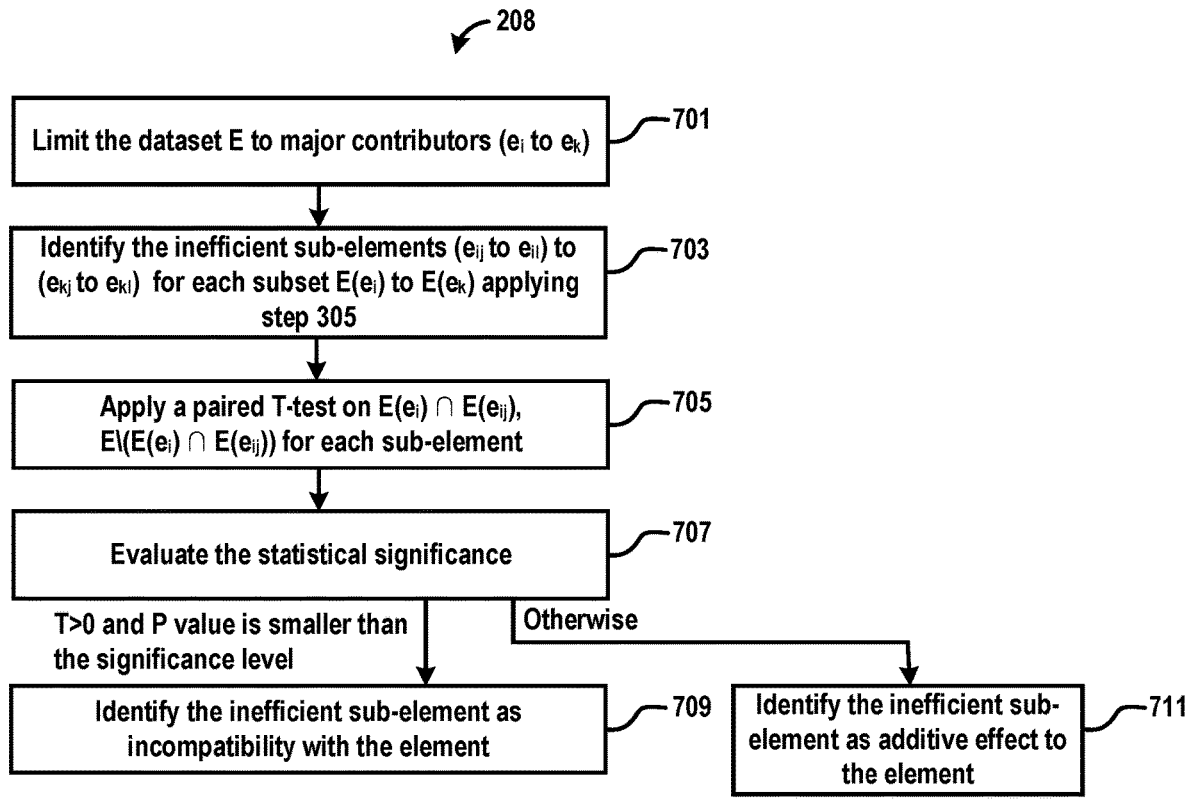
FIG. 7 is a flow chart illustrating a simplified, example method for establishing hierarchical relationships and mutual dependencies between inefficient elements, in accordance with example embodiments.

FIG. 7 is a flow chart illustrating a simplified, example method for establishing hierarchical relationships and mutual dependencies between inefficient elements, in accordance with example embodiments. The influence analysis 208 (corresponding to step 208 in FIG. 2) may be performed by the Influence Analyzer 110 of FIG. 1. For each element identified as a major contributor ($e_i$ to $e_k$) from the dataset E (at step 701), the method determines whether in the subset including the element $e_i$, $E(e_i)$, there exists other sub-elements $e_{ij}$ to $e_{il}$ within the subset $E(e_i)$ that contribute to performance metric degradation. Consequently, this strategy highlights the contribution of sub-elements, $e_{ij}$ to $e_{il}$, on a particular inefficient element's metric results. Sub-elements that meet these criteria are referred to as "influencer elements" or just "influencers." The subset of influencer elements $e_{ij}$ to $e_{il}$, of a particular inefficient $e_i$ is referred to herein as an "influencer set" of $e_i$.

In cases where such sub-elements exist—i.e., where an influencer set exists—their influence may be caused by an additive effect of independent faulty elements or incompatibilities between elements causing network inefficiencies. Identification of a possible influencer set for each inefficient element is carried out at step 703, and may be accomplished again by applying step 305, as detailed in FIG. 6, individually on each subset $E(e_i)$ to $E(e_k)$ to find for each possible inefficient sub-elements; e.g., $e_{ij}$ to $e_{il}$ for $E(e_i)$, $e_{kj}$ to $e_k$i for $E(e_k)$, and so on. In accordance with example embodiments, this step may be carried out for each $e_i$ to $e_k$ by separately taking each $e_i$ to $e_k$ to be the "current major contributor," and then selecting only those feature vectors of the data set E containing the current major contributor.

The effect that a given influencer may have on a particular inefficient element in causing or amplifying its inefficiency (i.e., its statistically significant negative contribution to an associated performance metric) may be additive, or may be due to an incompatibility between the feature-value pairs that correspond to the particular inefficient element and the given influencer. To determine whether the influence entails an additive effect or an incompatibility between the two elements, an additional step 705 may taken once an influential sub-element is discovered. Given an element $e_i$ and the sub-element $e_{ij}$ derived from $E(e_i)$, the intersection of subsets $E(e_i) \cap E(e_{ij})$ may be taken to perform an additional comparison. A T-test calculation may then be performed comparing the distribution of metric scores for the sets $E(e_i) \cap E(e_{ij})$ against the complement distribution $E\backslash(E(e_i) \cap E(e_{ij}))$ to distinguish between an additive effect and an incompatibility.

In cases where $e_i$ and $e_{ij}$ appear independently, their impact may be weighted against intersectional cases in the complement distribution at step 707. If there is a statistically significant difference between the distribution of metric scores for $E(e_i) \cap E(e_j)$ and for $E\backslash(E(e_i) \cap E(e_j))$, then the combination of elements may be deemed an incompatibility in accordance with the P-value set at 709. Conversely, when no incompatibility is found, an additive effect may be assumed at step 711.

Dependency Analysis

Figure 8:
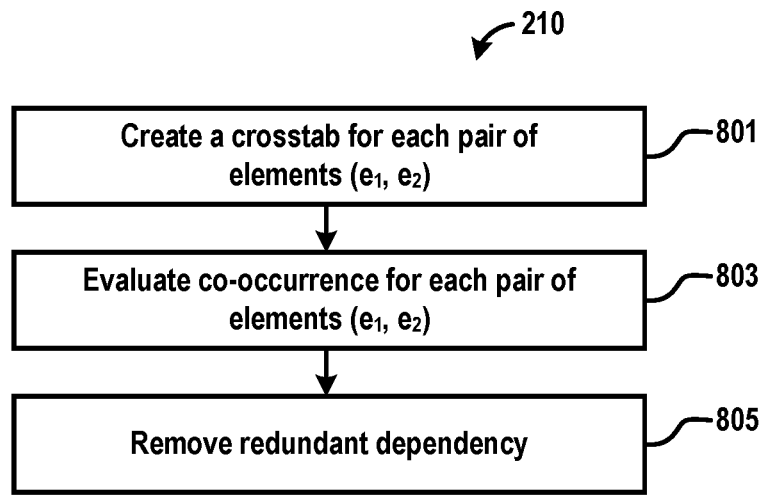
FIG. 8 is a flow chart illustrating a simplified, example method for determining the influence between influencer elements, in accordance with example embodiments.

FIG. 8 is a flow chart illustrating a simplified, example method for determining the influence between influencer elements, in accordance with example embodiments. The major contributor dependency analysis 210 (corresponding to step 210 in FIG. 2) may be performed by the Dependency Analyzer 112 of FIG. 1. The method may be used to establish hierarchical relationships and mutual dependencies between inefficient elements. Again adopting Set Theory, hierarchical dependency is a reflexive and transitive relation between two elements. The hierarchy forms a graph, establishing parent-child relationships between associated elements. To form this hierarchy, the element set of a child element must be a subset of the element set of the parent. For example, the content provider (e.g., Gmail®) is a child of content category (e.g., email). A mutual dependency is a bidirectional hierarchical dependency. It occurs when the element sets of two elements are equal, in which case two elements are said to be mutually dependent or equivalent.

Co-occurrence may be used to establish hierarchies, where a co-occurrence refers to two inefficient elements that occur in pairs within the same feature vectors. To determine co-occurrences, for each pair of inefficient elements (which include sub-elements from influence analysis), the method 210 starts at step 801 by creating a crosstab, which is a joint distribution of pairs of features. Then, at step 803, when a one-way co-occurrence threshold (e.g., 90%) is met, meaning that when the inefficient element $e_1=(f_1,v_1)$ occurs, in at least the threshold number of cases $e_2=(f_2,v_2)$ also occurs ($e_1$ is the parent and $e_2$ the child in this scenario), a hierarchical relationship is formed with a directional edge $e_1 \rightarrow e_2$. When a two-way co-occurrence is established (i.e., the threshold is satisfied such that $e_1 \rightarrow e_2$ and $e_1 \leftarrow e_2$), then a mutual dependency is formed, placing both elements in the same node and removing the parent-child relationship.

At step 805, redundant dependencies are removed as follows. For each hierarchical dependency between dependent elements (a parent $e_p$ and a child $e_c$), the mean of an associated network performance metric in computed for the set containing $e_p$, $E(e_p)$, and not containing $e_c$, $E(e_p)/E(e_c)$. Then, a pair of rules is applied to identify which elements are deemed inherently inefficient and which are deemed the mere result of the dependency on an inefficient element.

Rule 1: If the mean of the metric containing the parent but excluding the child $E(e_p)/E(e_c)$, is lower than the mean of the metric in the associated major contributor dataset $E(e_i)$, then the child is considered the root of the inefficiency of parent. In this case the parent is pruned.

Rule 2: If the mean of the metric containing the child $E(e_c)$, is smaller than the mean of the metric containing the parent $E(e_p)$ with an additional margin factor (e.g., 5% to 10%), then the parent is considered the root of the inefficiency of the child. In this case the child is pruned.

Graphing and Pruning

Figure 9:
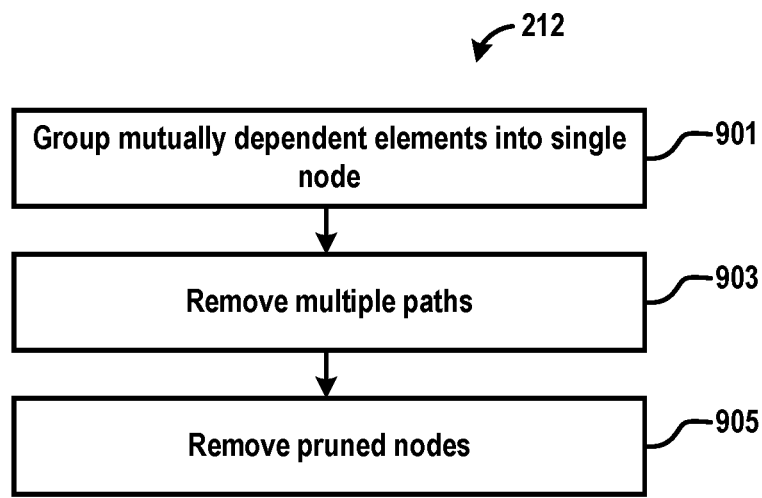
FIG. 9 is a flow chart illustrating a simplified, example method for grouping mutually dependent inefficient elements and prune dependencies, in accordance with example embodiments.

FIG. 9 is a flow chart illustrating a simplified, example method for grouping mutually dependent inefficient elements and prune dependencies, in accordance with example embodiments. Graphing and pruning 212 (corresponding to step 212 in FIG. 2) may be generated by the Graph Generator 114 of FIG. 1. It presents all elements identified as major contributors with their influential elements. At step 901, the elements that are mutually dependent are grouped in one node. At step 903 multiple paths are removed. Specifically, for each pair of connected nodes, all the paths connecting them are evaluated using Depth First Search (DFS) algorithm. Then, only the longest path between these two nodes is kept. This method may simplify the graph by reducing the number of edges without any information loss. At step 905, the nodes representing the pruned elements are removed as these nodes are not the root causes of network inefficiencies.

Simplified Example

A practical example implementation for the methods and systems described herein is shown in FIGS. 10A, 10B, and 10C, and 11. An example application provides a user interface 116 for displaying the graph generated by the automatic root cause analysis method and system of the present disclosure to a user.

FIGS. 10A, 10B, and 10C represent results of a simplified example of a graph highlighting the influence of elements on major contributors. The top nodes 1002, 1022, and 1042 in FIGS. 10A, 10B, and 10C represent major contributors as determined based on a direct association with network performance degradation determined in step 108. All other nodes in the graph result from the influence analysis step 110, with dependency arrangements such as the combination of several elements in a single node and edges between nodes determined during the dependency analysis step 112 resolved, and finally the graph pruning operations at step 114.

By way of example, the three top nodes 1002, 1022, 1042 illustrate different possible scenarios of influence of elements on major contributors. The top node 1002 indicates that the LTE serving gateway number 35 (Node2 Name: SGW35) is a major contributor to the network performance metric degradation (e.g. mobile network call setup time). The influential elements to this major contributor are the service type Tunneling (node 1004), the SSL service (node 1006) and the TLS service (node 1008). They have been identified as the most influential elements to metric degradation for the major contributor Node2 Name:SGW35 (node 1002). Two hierarchical parent-child relationships (edges 1012, 1014) have been established between influential elements. The edges 1012 and 1014 indicate a one-way co-occurrence between respectively the influential elements Service:SSL and Service:TLS (nodes 1006 and 1008) and the influential element Service Type:Tunneling (node 1004). The directional edge indicates that when Service Type:Tunneling occurs, in at least the threshold number of cases Service:SSL or Service:TLS also occurs. The edge 1010 attaches the parent Service Type:Tunneling (node 1004) to its corresponding major contributor node 1002. Then, at step 703 by rule 2, the influential element Service Type:Tunneling (node 1004) has been identified as less explanatory than its children Service:SSL and Service:TLS (nodes 1006 and 1008). Consequently, this dependency has been pruned (as signified by the diagonal hatch marks). Finally, the influence qualification has determined that Service:SSL (node 1006) is explainable as an incompatibility with the major contributor Node2 Name:SGW35 (node 1002) outlined by a dashed line 1016 and that Service:TLS (node 1008) is explainable as an additive effect as it did not pass the incompatibility assessment. The combination of Service:SSL (node 1006) and Node2 Name:SGW35 (node 1002) represents a possible root causes of the network performance metric degradation. Service:TLS and Node2 Name:SGW35 may also represent independent compounding root causes.

By way of example, the top node 1022 indicates that the handset type Phone B (Handset Type:Phone B) is also a major contributor to the network performance metric degradation. The influential elements to this major contributor are the handset manufacturer Vendor A (node 1024), the service type Gaming (node 1026), the content category Gaming (node 1026), the content provider Game (node 1028) and the service Game A (node 1028). They have been identified in this example as the most influential elements to metric degradation for the major contributor Handset Type: Phone B (node 1022). Mutual dependencies have been identified between Service Type:Gaming and Content Category:Gaming. Consequently, they have been grouped into a single node 1026. Similarly, Content Provider:Game and Service:Game A have been grouped into a single node 1028. Two hierarchical relationships (edges 1032 and 1034) have been established between influential elements. The influential elements Service Type:Gaming and Content Category: Gaming (nodes 1026) are the children of the influential element Handset Manufacturer:Vendor A (node 924) and Content Provider:Game and Service:Game A (node 1028) are the children of the influential elements Service Type: Gaming and Content Category:Gaming (nodes 1026). The edge 1030 attaches the parent Handset Manufacturer:Vendor A (node 1024) to its corresponding major contributor node 1022. Then, at step 703 by rule 2, the influential element Handset Manufacturer:Vendor A (node 1024) has been identified as less explanatory than its children Service Type: Gaming and Content Category:Gaming (nodes 1026). Consequently, this dependency has been pruned (as signified by the diagonal hatch marks). Also, at step 703 by rule 1, the influential elements Content Provider:Game and Service: Game A (node 1028) have been identified as less explanatory than their parents Service Type:Gaming and Content Category:Gaming (nodes 1026). Consequently, this dependency has been pruned (as signified by the diagonal hatch marks). Finally, the influence qualification has determined that Service Type:Gaming and Content Category:Gaming (nodes 1026) is explainable as an additive effect as it did not pass the incompatibility assessment. The combination of Service Type:Gaming and Content Category:Gaming (nodes 1026) with Handset Type:Phone B (node 1022) represents a possible root causes of the network performance metric degradation.

By way of example, the top node 1042 indicates that the service type Email (Service Type:Email) is also a major contributor to the network performance metric degradation. In this example, no other elements were found during the influence analysis. Thus, the graph would comprise only the major contributor as a single node. The Service Type:Email (node 1042) represents a possible root causes of the network performance metric degradation.

FIG. 11 shows an example source code in Python for the Major Contributors Identifier 108, the Influence Analyzer 110, the Dependency Analyzer 112 and the Graph Generator 114.

II. EXAMPLE OPERATING ENVIRONMENT AND EXAMPLE SYSTEM

Figure 12:
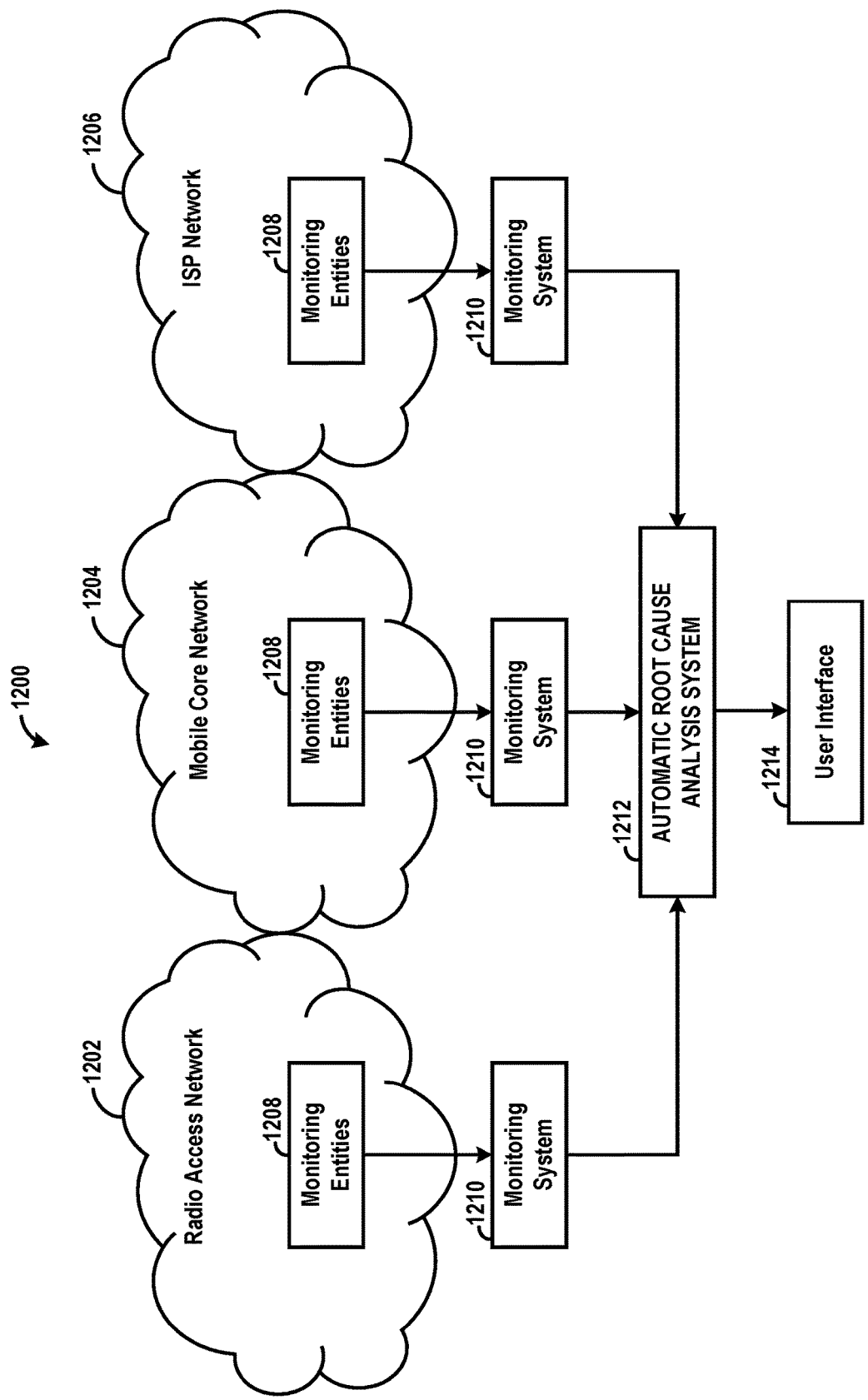
FIG. 12 shows a simplified, example environment in which an example system and method for the automatic root cause analysis may be implemented, in accordance with example embodiments.

FIG. 12 shows a block diagram of the environment 1200 in which the example operates. Multiple monitoring entities 1208 are deployed in Radio Access Network 1202, Mobile core network 1204, internet service provider (ISP) network 1206, or in other types of network. Monitoring systems 1210 collect the network monitoring data and feed the automatic root cause analysis system 1212 to identify the possible root causes of networks performance degradation. The possible root causes are presented on the user interface 1214, which could be standalone or integrated into network operator Operations Support Systems.

Figure 13:
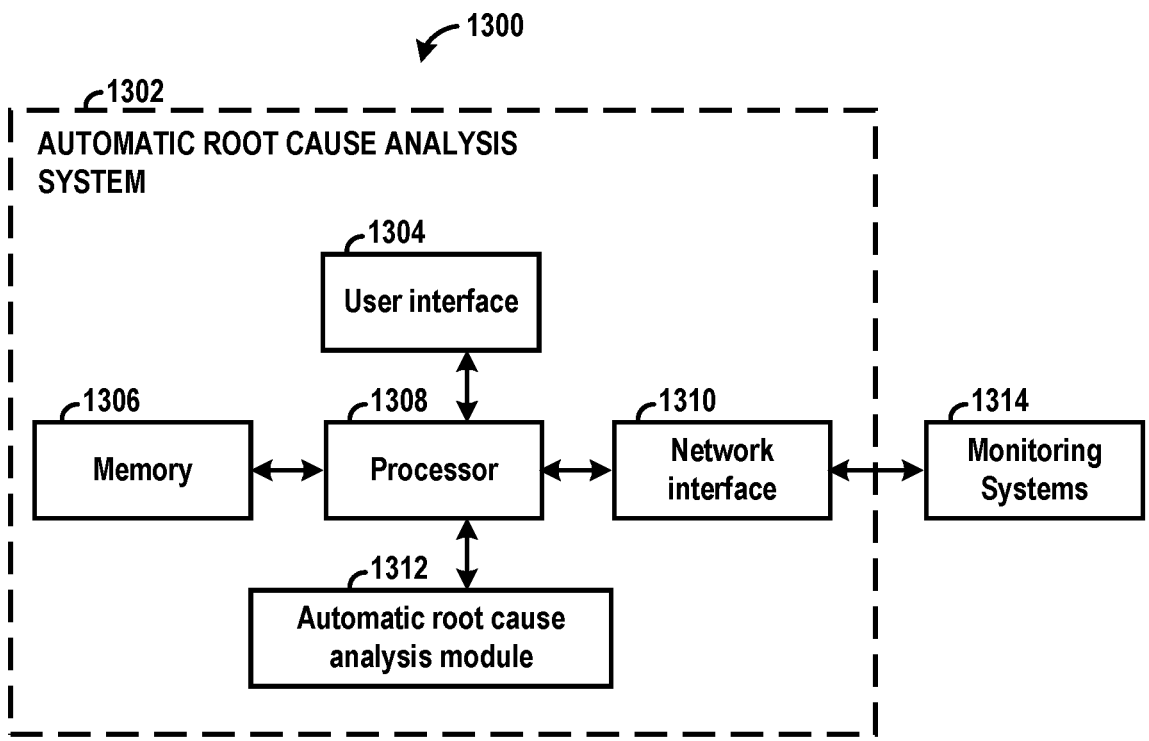
FIG. 13 is a block diagram of an example system for the automatic root cause analysis, in accordance with example embodiments.

FIG. 13 is a block diagram of an example system 1300 for the automatic root cause analysis, in accordance with example embodiments. The example system 1300 may be or include elements or components of a computing device or system, such as that described above. As such system 1300 may include a processor 1308, memory 1306, and a user interface 1304. Also shown is an automatic root cause analysis module 1312, which may be implemented as separate hardware, software, firmware, or on a virtual machine or container. In an example embodiment, the automatic root cause analysis module 1312 may be instructions stored in the memory 1306 that, when executed by the processor 1308, cause the analysis system 1302 to carry out operations described herein. The analysis system 1302 may also include a network interface 1310 with a communicative connection to a monitoring system 1314 of a network. Interconnections between the elements within the analysis system 1302, indicated by double arrows, may represent one or more bus or other interconnection structures.

III. EXAMPLE OPERATIONS

Figure 14:
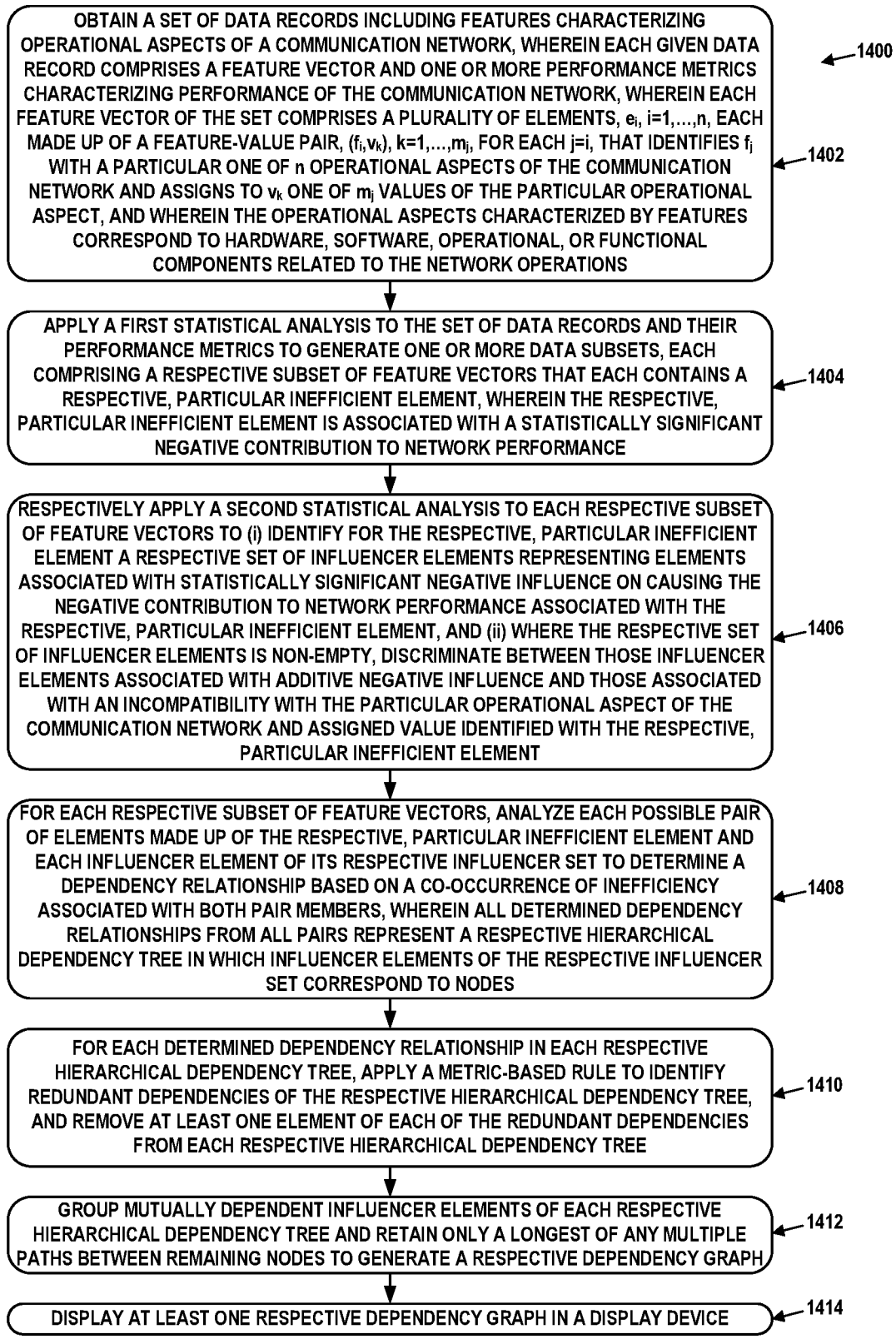
FIG. 14 is a flow chart of an example method, in accordance with example embodiments.

FIG. 14 is a flow chart illustrating an example embodiment of a method 1400. The method illustrated by FIG. 14 may be carried out by a computing device, such as computing device analysis system 1302 or as described above in connection with FIG. 1. However, the process can be carried out by other types of devices or device subsystems. For example, the process could be carried out by a portable computer, such as a laptop or a tablet device.

The embodiments of FIG. 1400 may be simplified by the removal of any one or more of the features shown therein. Further, these embodiments may be combined with features, aspects, and/or implementations of any of the previous figures or otherwise described herein.

The example method 1400 may also be embodied as instructions executable by one or more processors of the one or more server devices of the system or virtual machine or container. For example, the instructions may take the form of software and/or hardware and/or firmware instructions. In an example embodiment, the instructions may be stored on a non-transitory computer readable medium. When executed by one or more processors of the one or more servers, the instructions may cause the one or more servers to carry out various operations of the example method.

Block 1402 of example method 900 may involve obtaining a set of data records including features that characterize operational aspects of a communication network. Each given data record may be made up of at least a feature vector and one or more performance metrics characterizing operational performance of the communication network. In particular, each feature vector of the set may include a plurality of elements, $e_i$, i=1, ..., n, each made up of a feature-value pair, $(f_j, v_k)$, k=1, ..., $m_j$, for each j=i, that identifies $f_j$ with a particular one of n operational aspects of the communication network and that assigns to $v_k$ one of $m_j$ values of the particular operational aspect. As discussed above the operational aspects that are characterized by features may correspond to hardware, software, operational, or functional components related to the network operations. In an example embodiment, the set of data records may be or include log records of operations in the communication network. Each log record may be a voice call, a session detail record for a data session, a performance record, or a status or health check record for at least one of a network device, a network service, network operation system, or network monitoring system, for example.

Block 1404 may involve applying a first statistical analysis to the set of data records and their performance metrics to generate one or more data subsets of major contributors to one or more inefficiencies. More particularly, each of the data subsets may include a respective subset of feature vectors that each contains a respective, particular inefficient element. As discussed above, an inefficient element is one that is associated with a statistically significant negative contribution to network performance.

Block 1406 may involve respectively applying a second statistical analysis to each respective subset of feature vectors to identify influencer elements of the particular inefficient element, and to classify influencer elements as being either additive or associated with an incompatibility with the particular inefficient element. More specifically, for each respective subset of feature vectors, the second statistical analysis may be used to first identify a respective set of influencer elements representing elements associated with statistically significant negative influence on causing the negative contribution to network performance associated with the respective, particular inefficient element. Then, if the respective set of influencer elements is non-empty, the analysis may discriminate between those influencer elements associated with additive negative influence and those associated with an incompatibility with the particular operational aspect of the communication network and assigned value identified with the respective, particular inefficient element.

Block 1408 may involve analyzing the influencer elements to determine dependencies. In accordance with example embodiments, for each respective subset of feature vectors, each possible pair of elements of the influencer elements of the respective influencer set of the respective, particular inefficient element may be analyzed to determine a dependency relationship, based on a co-occurrence of inefficiency associated with both pair members. By doing so, all determined dependency relationships from all pairs may be represented in a respective hierarchical dependency tree in which influencer elements of the respective influencer set correspond to nodes.

Block 1410 may involve identifying redundant dependencies and removing them from the dependency tree. Specifically, for each determined dependency relationship in each respective hierarchical dependency tree, a metric-based rule may be applied to identify redundant dependencies of the respective hierarchical dependency tree. Then, at least one element of each of the redundant dependencies may be removed from each respective hierarchical dependency tree.

Block 1412 may involve grouping mutually dependent influencer elements of each respective hierarchical dependency tree and retaining only a longest of any multiple paths between remaining nodes to generate a respective dependency graph. This results in a "pruned" dependency tree in which the remaining edges have been effectively clarified to reveal and diagnose root causes of major contributors to network degradation.

Finally, block 1414 may involve displaying at least one respective dependency graph in a display device of the system. Advantageously, the displayed graph may provide a graphical rendering of the relationships between major contributors to network degradation and their root causes.

In accordance with example embodiments, the first statistical analysis may include a $\chi^2$ test to identify redundant features, followed by filtering to select only features that provide discriminating information. After selection, a means test may be applied to determine which elements are major contributors. In an example embodiment, these operations may entail applying a $\chi^2$ test for each pair $(f_j, f_k)$, $j \neq k$, in the set of data records to identify redundant pairs for which $f_j$ and $f_k$ provide redundant information with respect to respectively associated metrics. One of the pair members of each redundant pair may then be marked as excluded from consideration in further analysis. Next, for each $f_{j=t}$ not marked as excluded from consideration the set of data records may be subdivided into one or more respective feature subsets each having the same respective value $v_i$, after which a variance test with respect to the associated metric may be applied to the respective feature subsets to determine whether $f_{j=t}$ represents a discriminating feature. If not, $f_{j=t}$ may be marked as excluded from consideration in further analysis. Finally, elements and features of the remaining data records may be analyzed for major contributors. Specifically, for each particular element of the remaining set of data records is one that has an identical value and corresponds to a feature $f_{j=s}$ that is not excluded from consideration by either the $\chi^2$ test or the variance test. Statistics of the performance metric(s) associated with each such element are computed, and if a statistically significant negative contribution to network performance with respect to an associated performance metric is determined, the associated element is deemed a major contributor, and identified as an inefficient element. Thus, the respective data subset associated with each inefficient element may be retained as one of the generated one or more data subsets a respective collection of feature vectors each containing the particular element, wherein the particular element is the particular inefficient element.

In further accordance with example embodiments, determining major contributors may be based on comparing means of performance metrics of "candidate" inefficient elements with means of all elements. Specifically, considering a given particular element, a first mean of an associated performance metric for a first data set that includes the given particular element may be computed. Then a second mean of the associated performance metric for a second data set that excludes the given particular element may be computed. Finally, based on a comparison of the first and second computed means, it may be determined that the given particular element has a statistically significant negative contribution to network performance with respect to the associated performance metric.

In accordance with example embodiments, generating the one or more data subsets by applying a first statistical analysis to the set of data records and their performance metrics may entail ranking the respective, particular inefficient elements of among the respective subsets into a list according to increasing negative contribution to network performance, and then retaining only a threshold number of list elements in ranked order. For example, only the top 50 major contributors, based on how negatively they contribute to network performance, may be retained for root cause analysis. Other threshold numbers (e.g., besides 50) may be used as well.

In accordance with example embodiments, applying the second statistical analysis may be used to identify influencer elements. Specifically, for each respective subset of feature vectors, every given element—except for the particular inefficient element—that has an identical value and has a statistically significant negative contribution to network performance with respect to an associated performance metric may be identified as an influencer element, and thus included in the respective set of influencer elements for the particular inefficient element.

In accordance with example embodiments, applying the second statistical analysis may further discriminate between additive influences and one caused by incompatibilities. Specifically, for each influencer of the respective, particular inefficient element (major contributor), a respective influencer subset of feature vectors corresponding to those containing the given influencer element is first determined. Then, for each respective influencer subset the following operations may be carried out: (i) determining a first intersection with the respective subset of feature vectors; (ii) determining a second intersection with a complementary set of respective subset of feature vectors; (iii) applying a T-test to compare the first and second intersections. Finally (iv), if the T-test comparison yields a statistically significant difference, then marking the given influencer element as an incompatibility element, otherwise mark the given influencer element as an additive element.

In accordance with example embodiments analyzing each possible pair of elements of the influencer elements of respective influencer sets to determine a dependency relationships may entail determining a joint distribution of the respective associated features $(f_r, f_t)$ for each possible pairing of the influencer elements of each respective influencer set. A co-occurrence of the influencer elements of the respective influencer set may then be determined based on the joint distribution. Further, each co-occurrence it may be determined whether it is directional or two-way.

In accordance with example embodiments, identifying redundancies and removing them from the hierarchical dependency tree may entail, for each hierarchical dependency between a dependent parent element, $e_p$, and a dependent child element $e_c$, computing a first metric mean with respect to an associated performance metric of each of $e_p$ and $e_c$ for a first particular set containing $e_p$ and not containing e. A second metric mean with respect to the associated performance metric may be computed for second particular set containing the respective, particular inefficient element, and the first and second metric means may be compared. If the first metric mean is smaller than the second metric mean, then the parent element may be removed from the respective hierarchical dependency tree. If the second metric mean is smaller than the first metric mean by more than a threshold amount, then the child element may be removed from the respective hierarchical dependency tree.

In accordance with example embodiments, grouping mutually dependent influencer elements of each respective hierarchical dependency tree and retaining only a longest of any multiple paths between remaining nodes to generate a respective dependency graph may entail, for each node of each respective hierarchical dependency tree, grouping mutually dependent element. Then, for each pair of nodes connected with multiple paths, a depth first search (DFS) algorithm may be applied to determine the longest of the multiple paths. Finally all of multiple paths that are not the longest paths may be removed.

IV. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CDROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computer-implemented method comprising:

obtaining a set of data records including features that characterize operational aspects of a communication network, wherein each given data record comprises a feature vector and one or more performance metrics characterizing operational performance of the communication network, wherein each feature vector of the set comprises a plurality of elements, $e_i$, $i=1, \ldots, n$, each made up of a feature-value pair, $(f_j, v_k)$, $k=1, \ldots, m_j$, for each $j=i$, that identifies $f_j$ with a particular one of n operational aspects of the communication network and assigns to $v_k$ one of $m_j$ values of the particular operational aspect, wherein $e_i$ is a set of elements indexed by integer index i, $f_j$ is a set of features indexed by integer index j, $v_k$ is a set of values assigned to $f_j$ and indexed by integer index k, wherein i ranges from 1 to upper limit n, wherein for each $e_i$, $j=i$, wherein k ranges from 1 to upper limit $m_j$, wherein $m_j$ is the jth upper limit, and wherein the operational aspects characterized by features correspond to hardware, software, operational, or functional components related to the network operations;

applying a first statistical analysis to the set of data records and the performance metrics of the data records to generate one or more data subsets, each comprising a respective subset of feature vectors that each contains a respective, particular inefficient element, wherein the respective, particular inefficient element is associated with a statistically significant negative contribution to network performance;

respectively applying a second statistical analysis to each respective subset of feature vectors to (i) identify for the respective, particular inefficient element a respective set of influencer elements representing elements associated with statistically significant negative influence on causing the negative contribution to network performance associated with the respective, particular inefficient element, and (ii) where the respective set of influencer elements is non-empty, discriminate between those influencer elements associated with additive negative influence and those associated with an incompatibility with the particular operational aspect of the communication network and assigned value identified with the respective, particular inefficient element;

for each respective subset of feature vectors, analyzing each possible pair of elements of the influencer elements of the respective influencer set of the respective, particular inefficient element to determine a dependency relationship based on a co-occurrence of inefficiency associated with both pair members, wherein all determined dependency relationships from all pairs represent a respective hierarchical dependency tree in which influencer elements of the respective influencer set correspond to nodes;

for each determined dependency relationship in each respective hierarchical dependency tree, applying a metric-based rule to identify redundant dependencies of the respective hierarchical dependency tree, and removing at least one element of each of the redundant dependencies from each respective hierarchical dependency tree;

grouping mutually dependent influencer elements of each respective hierarchical dependency tree and retaining only a longest of any multiple paths between remaining nodes to generate a respective dependency graph; and displaying at least one respective dependency graph in a display device of the system.

2. The computer-implemented method of claim 1, wherein applying a first statistical analysis to the set of data records and the performance metrics of the data records to generate the one or more data subsets, each comprising the respective subset of feature vectors that each contains a respective, particular inefficient element, comprises:

for each pair $(f_j, f_k)$, $j \neq k$, in the set of data records, applying a $\chi^2$ test to identify redundant pairs for which $f_j$ and $f_k$ provide redundant information with respect to respectively associated metrics, and for each redundant pair, marking one of the pair members as excluded from consideration in further analysis;

for each $f_{j=t}$ not marked as excluded from consideration, subdividing the set of data records into one or more respective feature subsets each having the same respective value $v_i$, and applying, with respect to respectively associated metrics, a variance test to the respective feature subsets to determine whether $f_{j=t}$ represents a discriminating feature, and if not, marking $f_{j=t}$ as excluded from consideration in further analysis, wherein t is an index of $f_j$ in the range defined for index j; and for each particular element of the set of data records having (i) an identical value and corresponding to a feature $f_{j=s}$ that is not excluded from consideration by either the $\chi^2$ test or the variance test, wherein s is an index of $f_j$ in the range defined for index j, and (ii) a statistically significant negative contribution to network performance with respect to an associated performance metric, retaining as one of the generated one or more data subsets a respective collection of feature vectors each containing the particular element, wherein the particular element is the particular inefficient element.

3. The computer-implemented method of claim 1, wherein applying a first statistical analysis to the set of data records and the performance metrics of the data records to generate the one or more data subsets, each comprising the respective subset of feature vectors that each contains a respective, particular inefficient element, comprises:

computing a first mean of an associated performance metric for a first data set that includes the given particular element;

computing a second mean of the associated performance metric for a second data set that excludes the given particular element; and based on a comparison of the first and second computed means, determining that the given particular element has a statistically significant negative contribution to network performance with respect to the associated performance metric.

4. The computer-implemented method of claim 1, wherein applying a first statistical analysis to the set of data records and the performance metrics of the data records to generate the one or more data subsets, each comprising the respective subset of feature vectors that each contains a respective, particular inefficient element, comprises:

ranking the respective, particular inefficient elements of among the respective subsets into a list according to increasing negative contribution to network performance; and retaining only a threshold number of list elements in ranked order.

5. The computer-implemented method of claim 1, wherein applying the second statistical analysis to each respective subset of feature vectors to identify for the respective, particular inefficient element a respective set of influencer elements comprises:

for each respective subset of feature vectors, identifying every given element, excluding the particular inefficient element, having (i) an identical value, and (ii) a statistically significant negative contribution to network performance with respect to an associated performance metric; and including the given element in the respective set of influencer elements.

6. The computer-implemented method of claim 1, wherein applying the second statistical analysis to each respective subset of feature vectors to discriminate between those influencer elements associated with additive negative influence and those associated with an incompatibility with the particular operational aspect of the communication network and assigned value identified with the respective, particular inefficient element, comprises:

for each respective subset of feature vectors, determining for each given influencer element of the respective influencer set, a respective influencer subset of feature vectors corresponding to those containing the given influencer element; and for each respective influencer subset:
(i) determining a first intersection with the respective subset of feature vectors;
(ii) determining a second intersection with a complementary set of respective subset of feature vectors;
(iii) applying a T-test to compare the first and second intersections; and
(iv) if the T-test comparison yields a statistically significant difference, then marking the given influencer element as an incompatibility element, otherwise marking the given influencer element as an additive element.

7. The computer-implemented method of claim 1, wherein analyzing each possible pair of elements of the influencer elements of the respective influencer set of the respective, particular inefficient element to determine a dependency relationship based on a co-occurrence of inefficiency associated with both pair members comprises:

for each possible pairing of the influencer elements of the respective influencer set, determining a joint distribution of the respective associated features $(f_r, f_t)$, wherein r and t are indices of $f_j$ in the range defined for index j;

determining a co-occurrence of the influencer elements of the respective influencer set based on the joint distribution; and determining for each co-occurrence whether it is directional or two-way.

8. The computer-implemented method of claim 1, wherein, for each determined dependency relationship in each respective hierarchical dependency tree, applying a metric-based rule to identify redundant dependencies of the respective hierarchical dependency tree, and removing at least one element of each of the redundant dependencies from each respective hierarchical dependency tree comprises:
  for each hierarchical dependency between a dependent parent element, $e_p$, and a dependent child element $e_c$, computing a first metric mean with respect to an associated performance metric of each of $e_p$ and $e_c$ for a first particular set containing $e_p$ and not containing $e_c$, wherein p and c are indices of $e_i$ in the range defined for index i;
  computing a second metric mean with respect to the associated performance metric for second particular set containing the respective, particular inefficient element;
  comparing the first and second metric means;
  if the first metric mean is smaller than the second metric mean, then removing the parent element from the respective hierarchical dependency tree; and
  if the second metric mean is smaller than the first metric mean by more than a threshold amount, then removing the child element from the respective hierarchical dependency tree.

9. The computer-implemented method of claim 1, wherein grouping mutually dependent influencer elements of each respective hierarchical dependency tree and retaining only a longest of any multiple paths between remaining nodes to generate a respective dependency graph comprises:
  for each node of each respective hierarchical dependency tree, grouping mutually dependent elements;
  for each pair of nodes connected with multiple paths, applying a depth first search (DFS) algorithm to determine the longest of the multiple paths; and
  removing all of multiple paths that are not the longest paths.

10. The computer-implemented method of claim 1, wherein the set of data records comprises log records of operations in the communication network,
  and wherein the each log record is one of a voice call, a session detail record for a data session, a performance record, or a status or health check record for at least one of a network device, a network service, network operation system, or network monitoring system.

11. A system comprising:
  one or more processors; and
  memory configured for storing instructions that, when executed by the one or more processors, cause the system to carry out operations including:
  obtaining a set of data records including features that characterize operational aspects of a communication network, wherein each given data record comprises a feature vector and one or more performance metrics characterizing operational performance of the communication network, wherein each feature vector of the set comprises a plurality of elements, $e_i$, i=1, ..., n, each made up of a feature-value pair, $(f_j,v_k)$, k=1, ..., $m_j$, for each j=i, that identifies $f_j$ with a particular one of n operational aspects of the communication network and assigns to $v_k$ one of $m_j$ values of the particular operational aspect, wherein $e_i$ is a set of elements indexed by integer index i, $f_j$ is a set of features indexed by integer index j, $v_k$ is a set of values assigned to $f_j$ and indexed by integer index k, wherein i ranges from 1 to upper limit n, wherein for each $e_i$, j=i, wherein k ranges from 1 to upper limit $m_j$, wherein $m_1$ is the jth upper limit, and wherein the operational aspects characterized by features correspond to hardware, software, operational, or functional components related to the network operations;
  applying a first statistical analysis to the set of data records and the performance metrics of the data records to generate one or more data subsets, each comprising a respective subset of feature vectors that each contains a respective, particular inefficient element, wherein the respective, particular inefficient element is associated with a statistically significant negative contribution to network performance;
  respectively applying a second statistical analysis to each respective subset of feature vectors to (i) identify for the respective, particular inefficient element a respective set of influencer elements representing elements associated with statistically significant negative influence on causing the negative contribution to network performance associated with the respective, particular inefficient element, and (ii) where the respective set of influencer elements is non-empty, discriminate between those influencer elements associated with additive negative influence and those associated with an incompatibility with the particular operational aspect of the communication network and assigned value identified with the respective, particular inefficient element;
  for each respective subset of feature vectors, analyzing each possible pair of elements of the influencer elements of the respective influencer set of the respective, particular inefficient element to determine a dependency relationship based on a co-occurrence of inefficiency associated with both pair members, wherein all determined dependency relationships from all pairs represent a respective hierarchical dependency tree in which influencer elements of the respective influencer set correspond to nodes;
  for each determined dependency relationship in each respective hierarchical dependency tree, applying a metric-based rule to identify redundant dependencies of the respective hierarchical dependency tree, and removing at least one element of each of the redundant dependencies from each respective hierarchical dependency tree;
  grouping mutually dependent influencer elements of each respective hierarchical dependency tree and retaining only a longest of any multiple paths between remaining nodes to generate a respective dependency graph; and
  displaying at least one respective dependency graph in a display device.

12. The system of claim 11, wherein applying a first statistical analysis to the set of data records and the performance metrics of the data records to generate the one or more data subsets, each comprising the respective subset of feature vectors that each contains a respective, particular inefficient element, comprises:
  for each pair $(f_j,f_k)$, j≠k, in the set of data records, applying a $\chi^2$ test to identify redundant pairs for which $f_j$ and $f_k$ provide redundant information with respect to respectively associated metrics, and for each redundant pair, marking one of the pair members as excluded from consideration in further analysis;
  for each $f_{j=t}$ not marked as excluded from consideration, subdividing the set of data records into one or more respective feature subsets each having the same respective value $v_t$, and applying, with respect to respectively associated metrics, a variance test to the respective feature subsets to determine whether $f_{j=t}$ represents a discriminating feature, and if not, marking $f_{j=t}$ as excluded from consideration in further analysis, wherein t is an index of $f_j$ in the range defined for index j; and for each particular element of the set of data records having (i) an identical value and corresponding to a feature $f_{j=s}$ that is not excluded from consideration by either the $\chi^2$ test or the variance test, wherein s is an index of $f_j$ in the range defined for index j, and (ii) a statistically significant negative contribution to network performance with respect to an associated performance metric, retaining as one of the generated one or more data subsets a respective collection of feature vectors each containing the particular element, wherein the particular element is the particular inefficient element.

13. The system of claim 11, wherein applying a first statistical analysis to the set of data records and the performance metrics of the data records to generate the one or more data subsets, each comprising the respective subset of feature vectors that each contains a respective, particular inefficient element, comprises:

ranking the respective, particular inefficient elements of among the respective subsets into a list according to increasing negative contribution to network performance; and retaining only a threshold number of list elements in ranked order.

14. The system of claim 11, wherein applying the second statistical analysis to each respective subset of feature vectors to identify for the respective, particular inefficient element a respective set of influencer elements comprises:

for each respective subset of feature vectors, identifying every given element, excluding the particular inefficient element, having (i) an identical value, and (ii) a statistically significant negative contribution to network performance with respect to an associated performance metric; and including the given element in the respective set of influencer elements.

15. The system of claim 11, wherein applying the second statistical analysis to each respective subset of feature vectors to discriminate between those influencer elements associated with additive negative influence and those associated with an incompatibility with the particular operational aspect of the communication network and assigned value identified with the respective, particular inefficient element, comprises:

for each respective subset of feature vectors, determining for each given influencer element of the respective influencer set, a respective influencer subset of feature vectors corresponding to those containing the given influencer element; and for each respective influencer subset:
(i) determining a first intersection with the respective subset of feature vectors;
(ii) determining a second intersection with a complementary set of respective subset of feature vectors;
(iii) applying a T-test to compare the first and second intersections; and
(iv) if the T-test comparison yields a statistically significant difference, then marking the given influencer element as an incompatibility element, otherwise marking the given influencer element as an additive element.

16. The system of claim 11, wherein analyzing each possible pair of elements of the influencer elements of the respective influencer set of the respective, particular inefficient element to determine a dependency relationship based on a co-occurrence of inefficiency associated with both pair members comprises:

for each possible pairing of the influencer elements of the respective influencer set, determining a joint distribution of the respective associated features ($f_r$,$f_t$), wherein r and t are arbitrary indices of $f_j$ in the range defined for index j;

determining a co-occurrence of the influencer elements of the respective influencer set based on the joint distribution; and determining for each co-occurrence whether it is directional or two-way.

17. The system of claim 11, wherein, for each determined dependency relationship in each respective hierarchical dependency tree, applying a metric-based rule to identify redundant dependencies of the respective hierarchical dependency tree, and removing at least one element of each of the redundant dependencies from each respective hierarchical dependency tree comprises:

for each hierarchical dependency between a dependent parent element, $e_p$, and a dependent child element $e_c$, computing a first metric mean with respect to an associated performance metric of each of $e_p$ and $e_c$ for a first particular set containing $e_p$ and not containing $e_c$, wherein p and c are indices of $e_i$ in the range defined for index i;

computing a second metric mean with respect to the associated performance metric for second particular set containing the respective, particular inefficient element;

comparing the first and second metric means;

if the first metric mean is smaller than the second metric mean, then removing the parent element from the respective hierarchical dependency tree; and if the second metric mean is smaller than the first metric mean by more than a threshold amount, then removing the child element from the respective hierarchical dependency tree.

18. The system of claim 11, wherein grouping mutually dependent influencer elements of each respective hierarchical dependency tree and retaining only a longest of any multiple paths between remaining nodes to generate a respective dependency graph comprises:

for each node of each respective hierarchical dependency tree, grouping mutually dependent elements;

for each pair of nodes connected with multiple paths, applying a depth first search (DFS) algorithm to determine the longest of the multiple paths; and removing all of multiple paths that are not the longest paths.

19. The system of claim 11, wherein the set of data records comprises log records of operations in the communication network, and wherein the each log record is one of a voice call, a session detail record for a data session, a performance record, or a status or health check record for at least one of a network device, a network service, network operation system, or network monitoring system.

20. An article of manufacture including a non-transitory computer-readable medium, having stored thereon program instructions that, when executed by one more processors of a system, cause the system to carry out operations including:

obtaining a set of data records including features that characterize operational aspects of a communication network, wherein each given data record comprises a feature vector and one or more performance metrics characterizing operational performance of the communication network, wherein each feature vector of the set comprises a plurality of elements, $e_i$, i=1, ..., n, each made up of a feature-value pair, $(f_j, v_k)$, k=1, ..., $m_j$, for each j=i, that identifies $f_j$ with a particular one of n operational aspects of the communication network and assigns to $v_k$ one of $m_j$ values of the particular operational aspect, wherein $e_i$ is a set of elements indexed by integer index i, $f_j$ is a set of features indexed by integer index j, $v_k$ is a set of values assigned to $f_j$ and indexed by integer index k, wherein i ranges from 1 to upper limit n, wherein for each $e_i$, j=i, wherein k ranges from 1 to upper limit $m_j$, wherein $m_j$ is the jth upper limit, and wherein the operational aspects characterized by features correspond to hardware, software, operational, or functional components related to the network operations;

applying a first statistical analysis to the set of data records and the performance metrics of the data records to generate one or more data subsets, each comprising a respective subset of feature vectors that each contains a respective, particular inefficient element, wherein the respective, particular inefficient element is associated with a statistically significant negative contribution to network performance;

respectively applying a second statistical analysis to each respective subset of feature vectors to (i) identify for the respective, particular inefficient element a respective set of influencer elements representing elements associated with statistically significant negative influence on causing the negative contribution to network performance associated with the respective, particular inefficient element, and (ii) where the respective set of influencer elements is non-empty, discriminate between those influencer elements associated with additive negative influence and those associated with an incompatibility with the particular operational aspect of the communication network and assigned value identified with the respective, particular inefficient element;

for each respective subset of feature vectors, analyzing each possible pair of elements of the influencer elements of the respective influencer set of the respective, particular inefficient element to determine a dependency relationship based on a co-occurrence of inefficiency associated with both pair members, wherein all determined dependency relationships from all pairs represent a respective hierarchical dependency tree in which influencer elements of the respective influencer set correspond to nodes;

for each determined dependency relationship in each respective hierarchical dependency tree, applying a metric-based rule to identify redundant dependencies of the respective hierarchical dependency tree, and removing at least one element of each of the redundant dependencies from each respective hierarchical dependency tree;

grouping mutually dependent influencer elements of each respective hierarchical dependency tree and retaining only a longest of any multiple paths between remaining nodes to generate a respective dependency graph; and displaying at least one respective dependency graph in a display device.

\* \* \* \* \*